US012575016B2

(12) United States Patent
Peters et al.

(10) Patent No.: US 12,575,016 B2
(45) Date of Patent: Mar. 10, 2026

(54) CARTRIDGE FOR A LIQUID-COOLED PLASMA ARC TORCH

(71) Applicant: Hypertherm, Inc., Hanover, NH (US)

(72) Inventors: John Peters, Canaan, NH (US); Brian Currier, Newport, NH (US); David J. Cook, Bradford, VT (US); Stephen M. Dunbar, Lebanon, NH (US); David L. Bouthillier, Hartford, VT (US)

(73) Assignee: Hypertherm, Inc., Hanover, NH (US)

( * ) Notice: Subject to any disclaimer, the term of this patent is extended or adjusted under 35 U.S.C. 154(b) by 975 days.

(21) Appl. No.: 17/740,874

(22) Filed: May 10, 2022

(65) Prior Publication Data

US 2022/0369448 A1 Nov. 17, 2022

Related U.S. Application Data

(60) Provisional application No. 63/186,927, filed on May 11, 2021.

(51) Int. Cl.
*H05H 1/34* (2006.01)

(52) U.S. Cl.
CPC ........ *H05H 1/3436* (2021.05); *H05H 1/3423* (2021.05); *H05H 1/3478* (2021.05)

(58) Field of Classification Search
CPC .. H05H 1/3436; H05H 1/3423; H05H 1/3478; H05H 1/3457
See application file for complete search history.

(56) References Cited

U.S. PATENT DOCUMENTS

| | | | |
|---|---|---|---|
| 6,011,238 A | 1/2000 | Bertez et al. |
| 6,163,008 A | 12/2000 | Roberts et al. |
| 7,375,302 B2 | 5/2008 | Twarog et al. |
| 9,288,888 B2 | 3/2016 | Griffin et al. |
| 9,480,139 B2 | 10/2016 | Zhang et al. |
| 2003/0034333 A1 | 2/2003 | Horner-Richardson et al. |

(Continued)

FOREIGN PATENT DOCUMENTS

| | | |
|---|---|---|
| EP | 3716736 A1 | 9/2020 |
| WO | 03/089179 A1 | 10/2003 |

OTHER PUBLICATIONS

US 10,728,998 B2, 07/2020, Yamaguchi et al. (withdrawn)

(Continued)

*Primary Examiner* — Steven W Crabb
*Assistant Examiner* — Dilnessa B Belay
(74) *Attorney, Agent, or Firm* — Cesari and McKenna, LLP

(57) ABSTRACT

An electrode for a consumable cartridge of a plasma arc torch is provided. The electrode comprises a substantially hollow body defining a proximal end, a distal end and a longitudinal axis extending therebetween. The electrode also includes a plurality of flanges, including a proximal flange and a distal flange, disposed circumferentially about an external surface of the hollow body and extending radially outward. Each flange defines one or more holes configured to conduct a gas flow therethrough along the external surface of the hollow body. The one or more holes on the proximal flange define a first combined cross-sectional flow area that is different from a second combined cross-sectional flow area defined by the one or more holes on the distal flange.

36 Claims, 10 Drawing Sheets

(56) References Cited

U.S. PATENT DOCUMENTS

| | | | | |
|---|---|---|---|---|
| 2016/0165712 | A1* | 6/2016 | Zhang | H05H 1/34 |
| | | | | 219/121.52 |
| 2020/0196426 | A1 | 6/2020 | Sanders et al. | |

OTHER PUBLICATIONS

"European Search Report and Written Opinion," European Application No. 24183242.7-1211, Applicant: Hypertherm, Inc., Date of Mailing: Oct. 4, 2024, pp. 1-7.

"Partial European Search Report and Written Opinion," European Application No. 22172749.8-1211, Applicant: Hypertherm, Inc., Date of Mailing: Sep. 26, 2022, pp. 1-14.

* cited by examiner

CARTRIDGE FOR A LIQUID-COOLED PLASMA ARC TORCH

CROSS REFERENCE TO RELATED APPLICATION

This application claims the benefit of and priority to U.S. Provisional Patent Application No. 63/186,927, filed May 11, 2021, the entire content of which is owned by the assignee of the instant application and incorporated herein by reference in its entirety.

TECHNICAL FIELD

The present invention generally relates to cartridges for liquid-cooled plasma arc torches, where the cartridges encapsulate a number of consumable components.

BACKGROUND

Thermal processing torches, such as plasma arc torches, are widely used for high temperature processing (e.g., heating, cutting, gouging and marking) of materials. A plasma arc torch generally includes a torch head, an electrode mounted within the torch head, an emitter disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

Existing plasma cutting systems include a large array of separate consumables available for use with different currents and/or operating modes that are repeatedly assembled and disassembled in the field by a user to perform thermal processing operations. More specifically, the tip of traditional plasma arc torches generally requires installation of a set of consumables for properly directing a plasma arc to a workpiece to be processed. Each consumable combination can number anywhere from 3 to more distinct components. In addition, the combinations are variable depending on the task to be performed (e.g., cutting, gouging, etc.). To further complicate matters, these consumable components have different wear rates and life spans.

Such a large number of consumable options and variability requires large part counts and inventories, which can confuse operators and increase the possibility of installing incorrect consumables. As a result, consumables are often assembled/combined improperly. Operators can spend a great deal of time inspecting and changing consumables, leading to compromised cut quality, speeds, and consistency due to inconsistently worn and/or paired consumable combinations. The large number of consumable options can also cause lengthy torch setup time(s) and make it difficult to transition among cutting processes that require different arrangements of consumables in the torch, which is often performed in the field one component at a time. For example, before a cutting operation, selecting and installing the correct set of consumables for a particular cutting task can be burdensome and time-consuming. Furthermore, selection, assembly, and installation of these components in the field can cause alignment issues or compatibility issues when old components are used with new components. During torch operation, existing consumables can experience performance issues such as failing to maintain proper consumable alignment and spacing. Furthermore, current consumables include substantial amounts of expensive materials (e.g., Vespel™) and often require a relatively complex manufacturing process, which leads to significant manufacturing costs and inhibits their widespread commercialization, production and adoption. What is needed is a new and improved consumable platform for liquid-cooled plasma arc torches that decreases manufacturing costs and time, decreases part count, increases system performance (e.g., component alignment, cut quality, consumable life, variability/versatility, etc.), and eases installation and use of consumables by operators.

SUMMARY

The present invention provides one or more integrated, cost-effective cartridge designs for a liquid-cooled plasma arc torch. Generally, because a cartridge includes a suite of two or more consumable components, it provides ease of use and shortens the time for installation into a plasma arc torch in comparison to installing/replacing each consumable component individually. Using a consumable cartridge also reduces the possibility of an operator putting in the wrong consumable parts, contaminating the parts during installation and/or placing a weak or bad part back onto the torch by accident. These advantages eliminate the need for experienced operators to operate the resulting liquid-cooled plasma arc torches. In addition, the use of a cartridge in a liquid-cooled torch improves component alignment, cut consistency and cut quality experience. Further, using consumable cartridges enhances suppliers' experience as fewer consumable parts need to be inventoried and stocked. In some cases, a supplier can buy back used cartridges and recycle components for other uses. However, manufacturing and material costs can prohibit the widespread commercialization and production of cartridges. The present invention solves this problem by providing one or more cost effective cartridge designs that facilitate cartridge commercialization and production and improve their installation.

In one aspect, the present invention features an electrode for a consumable cartridge of a plasma arc torch. The electrode comprises a substantially hollow body defining a proximal end, a distal end and a longitudinal axis extending therebetween. The electrode also includes an emitter disposed at the distal end of the hollow body. The electrode further includes a plurality of flanges, including a proximal flange and a distal flange, disposed circumferentially about an external surface of the hollow body and extending radially outward. Each flange defines one or more holes configured to conduct a gas flow therethrough along the external surface of the hollow body. The one or more holes on the proximal flange define a first combined cross-sectional flow area that is different from a second combined cross-sectional flow area defined by the one or more holes on the distal flange.

In some embodiments, the distal flange is axially spaced and downstream from the proximal flange along the external surface of the hollow body. In some embodiments, the proximal and distal flanges cooperatively define a chamber therebetween. The chamber is radially bounded by the external surface of the hollow body of the electrode and an insulator surrounding at least a portion of the exterior surface of the hollow body. In some embodiments, the one or more holes of the proximal and distal flanges are in fluid communication with the chamber. In some embodiments, the first combined cross-sectional flow area is larger than the second combined cross-sectional flow area such that the chamber is pressurized by the gas flow entering the chamber from the one or more holes in the proximal flange and leaving the chamber from the one or more holes in the distal flange.

In some embodiments, a cross-sectional flow area of each of the one or more holes on the proximal flange is between about 0.0015 inches$^2$ and about 0.0075 inches$^2$. In some embodiments, a cross-sectional flow area of each of the one or more holes on the distal flange is about 0.008 inches$^2$. In some embodiments, the one or more holes on the distal flange are configured to provide swirling to a gas flow therethrough.

In some embodiments, the plurality of flanges include alignment surfaces configured to provide axial and radial alignment of the electrode relative to a nozzle when installed in the plasma arc torch. In some embodiments, the plurality of flanges increases a diameter of the electrode in relation to a diameter of the hollow body by about 35 percent or higher. In some embodiments, each of the plurality of flanges has a radial height of about 0.125 inches. In some embodiments, the proximal flange has an axial thickness of about 0.08 inches and the distal flange has an axial thickness of about 0.11 inches.

In some embodiments, the plurality of flanges are located at a distal half of the electrode body close to the distal end of the electrode. For example, the plurality of flanges is located on a distal ⅓ portion of the electrode close to the distal end of the electrode.

In some embodiments, the hollow body of the electrode is configured to conduct a liquid coolant therethrough. In some embodiments, a resilient element is circumferentially coupled to the proximal end of the hollow body of the electrode for engaging the electrode a torch body of the plasma arc torch without a threaded connection. The resilient element is configured to provide an electrical connection between the electrode and the torch body. In some embodiments, the resilient element is a Louvertac™ band. In some embodiments, the electrode includes a radially-extending contact surface shaped to provide primary conduction for the operating current.

In another aspect, a consumable cartridge of a liquid-cooled plasma arc torch is provided. The consumable cartridge comprises an electrode having a substantially hollow body and a plurality of flanges disposed circumferentially about an external surface of the hollow body. The cartridge also comprises an insulator circumferentially disposed about a portion of the external surface of the hollow body of the electrode. The plurality of flanges of the electrode in cooperation with the insulator define a gas chamber between the electrode and the insulator. The cartridge additionally includes a nozzle circumferentially disposed about the electrode and physically connected to the electrode via the insulator. The cartridge further includes a cartridge frame comprising an electrically insulating material with at least one cooling channel extending therethrough. A proximal portion of the nozzle is disposed within and coupled to the cartridge frame.

In some embodiments, the cartridge includes a shield circumferentially disposed about the nozzle. A proximal portion of the shield is disposed within and coupled to the cartridge frame. In some embodiments, a retaining cap is circumferentially disposed over an exterior surface of a proximal portion of the cartridge frame. In some embodiments, a stamped connector is circumferentially disposed over an exterior surface of a distal portion of the cartridge frame. The stamped connector is configured to physically retain the shield to the retaining cap.

In some embodiments, the insulator is comprised of an electrically insulating material with an oxygen index of about 0.9 or more. In some embodiments, the insulator is configured to axially and radially align the electrode and the nozzle relative to each other. In some embodiments, the insulator is at least 0.020 inches in thickness in a radial direction.

In some embodiments, the nozzle comprises a nozzle jacket and a nozzle body. The nozzle jacket is circumferentially disposed about an external surface of the nozzle body and defines a chamber therebetween.

In some embodiments, the plurality of flanges include a proximal flange and a distal flange, each flange having one or more holes extending therethrough. In some embodiments, the one or more holes on the proximal flange define a first combined cross-sectional flow area that is larger than a second combined cross-sectional flow area defined by the one or more holes on the distal flange. In some embodiments, the gas chamber is axially bounded by the proximal and distal flanges and radially bounded by the external surface of the hollow body of the electrode and the insulator.

In another aspect, the present invention features a method for conducting one or more fluid flows through a consumable cartridge of a plasma arc torch. The method includes providing a consumable cartridge comprising a cartridge frame coupled to a nozzle that is couples to an electrode via an insulator. The electrode comprises at least a proximal flange and a distal flange disposed circumferentially about an external surface of a hollow body of the electrode. The method also includes providing a plasma gas flow to the external surface of the hollow body of the electrode and conducting the plasma gas flow through at least one hole on the proximal flange of the electrode to a chamber created between the proximal and distal flanges of the electrode. The chamber is bounded axially by the proximal and distal flanges and radially by the external surface of the hollow body of the electrode and the insulator. The method further includes metering and swirling the plasma gas flow as the plasma gas flow exits the chamber via at least one hole on the distal flange and conducting the plasma gas flow distally to a plasma chamber defined between a distal end of the electrode and the nozzle.

In some embodiments, the at least one hole in the proximal flange defines a first combined cross-sectional flow area and the at least one hole in the distal flange defines a second combined cross-sectional flow area, the first combined cross-sectional flow area being different from the second combined cross-sectional flow area. In some embodiments, the method further includes pressurizing the chamber by the plasma gas flow based on the difference between the first and second combined cross-sectional flow areas. In some embodiments, the at least one hole on the distal flange is configured to introduce the swirling to the plasma gas flow. In some embodiments, the at least one hole on the proximal flange is configured to meter the plasma gas flow into the chamber. In some embodiments, the plasma gas flow is provided to the cartridge without traversing through cartridge frame. In some embodiments, the method further includes swirling the shield gas flow by one or more holes on a hollow body of the shield as the shield gas flow enters the shield.

In some embodiments, the method further includes conducting a coolant flow into the cartridge via an inlet coolant channel disposed in a body of the cartridge frame, circulating the coolant flow around at least one of the electrode or the nozzle coupled to the cartridge frame, and conducting the coolant flow away from the cartridge via an outlet coolant channel disposed in the body of the cartridge frame.

In some embodiments, the method further includes conducting a shield gas flow into the cartridge via an inlet shield gas channel disposed in the body of the cartridge frame, and providing, by the cartridge frame, the shield gas flow to a shield with a portion of which disposed within and coupled to the cartridge frame.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The present invention provides a liquid-cooled plasma arc torch that includes a disposable/consumable cartridge installed onto a torch head. In some embodiments, the consumable cartridge is a unitary component where the components of the cartridge are not individually serviceable or disposable. Thus, if one component of the consumable cartridge needs to be replaced, the entire cartridge is replaced. In some embodiments, the consumable cartridge is a "single use" cartridge, where the cartridge is replaced by the operator after any of the components thereof reaches the end of its service life rather than repairing and replacing the individual consumables like in traditional torch designs. In some embodiments, the cartridge is replaced after a single session, which can involve multiple arcs. In some embodiments, the cartridge is replaced after a single arc event.

Figure 1:
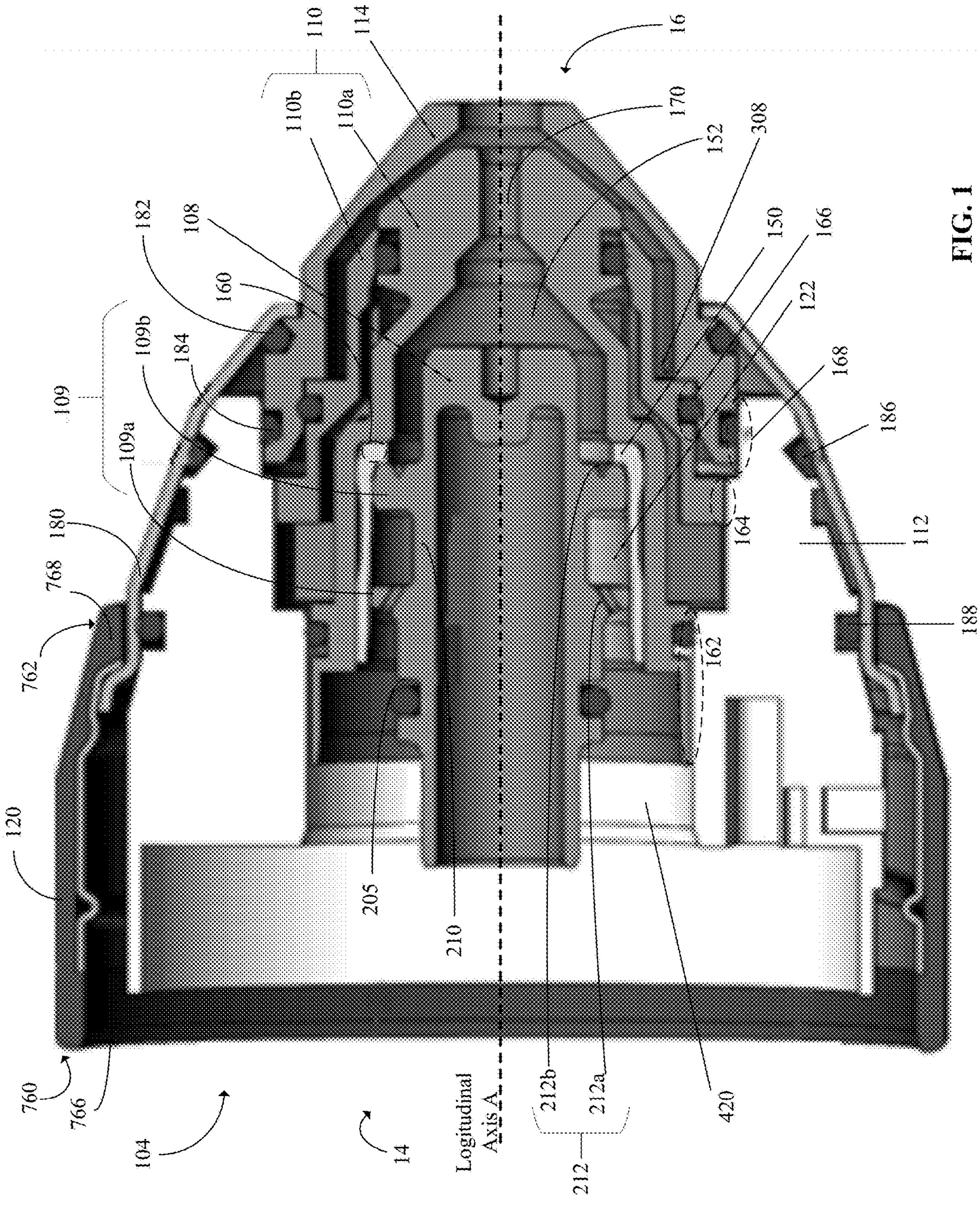
FIG. 1 shows a sectional view of an exemplary consumable cartridge for a liquid-cooled plasma arc torch, according to some embodiments of the invention.

FIG. 1 shows a sectional view of an exemplary consumable cartridge 104 for a liquid-cooled plasma arc torch, according to some embodiments of the invention. The cartridge 104, which comprises a plurality of consumable torch components, has a proximal end (region) 14 and a distal end (region) 16 along a central longitudinal axis A. In some embodiments, the proximal end 14 of the cartridge 104 is aligned with and can be quickly secured to and/or removed from the distal end of a torch head (not shown). In some embodiments, the proximal end 14 of the cartridge 104 matingly engages/connects to the distal end of the torch head. The engagement means between the torch head and cartridge 104 can include, for example, threading, interference fit, snap fit, quick lock, etc. Hereinafter, a proximal end of a component defines a region of the component along the longitudinal axis A that is away from a workpiece when the torch is used to process the workpiece, and a distal end of the component defines a region of the component that is opposite of the proximal end and close to the workpiece when the torch is used to process the workpiece.

As shown in FIG. 1, the cartridge 104, which is a substantially unitary element, includes an electrode 108 (i.e., an arc emitter), a nozzle 110 (i.e., an arc constrictor) and an optional shield 114 disposed concentrically about the central longitudinal axis A. These components can be connected, either directly or indirectly, to a cartridge frame 112 of the cartridge 104. In some embodiments, the nozzle 110 is a non-vented nozzle comprising an inner nozzle body 110*a* defining a central nozzle exit orifice 170, where the inner nozzle body 110*a* is connected to an outer nozzle jacket 110*b*. In alternative embodiments, the nozzle 110 is a vented nozzle. In some embodiments, a retaining cap 120 is used to secure the cartridge 104 to the distal end of the torch head via a shield retaining cap 180. The retaining cap 120 and/or the shield retaining cap 180 may be consumable components of the cartridge 104 or may be stand-alone components distinct from the cartridge 104. In general, the consumable components of the cartridge 104 can be selected and assembled (e.g., permanently joined) into a single unit to perform a specific task (e.g., gouging cartridge, cutting cartridge, etc.) and age/wear proportionally to each other such that they approach end of life along the same amount of usage time.

The cartridge frame 112 (which will be described in detail below with respect to FIGS. 7*a*-7*c* and 8*a*-8*c*) is adapted to form an interface between the cartridge 104 and the torch head. The various components of the cartridge 104, including the cartridge frame 112, the electrode 108, the nozzle 110 (comprising the nozzle body 110*a* and the nozzle jacket 110*b*) and the shield 114, can be concentrically disposed about the longitudinal axis A of the cartridge 104. In general, the various components of the cartridge 104 can be secured, either directly or indirectly, to the cartridge frame 112 while achieving axial and radial alignments (i.e., centering) with respect to the cartridge frame 112.

The electrode 108, which will be described in detail below with respect to FIG. 2, has a substantially hollow body 210 and a plurality of flanges 109 (including a proximal flange 109*a* and a distal flange 109*b*) disposed circumferentially about an external surface of the hollow body 210. The electrode 108 can be located in a central channel 420 of the cartridge frame 112 and connected to the cartridge frame via an insulator 150 and the nozzle 110. In some embodiments, the electrode 108 is secured to the inner nozzle body 110*a* of the nozzle 110 via the insulator 150. As shown, the insulator 150 is circumferentially disposed about a portion of the external surface of the hollow body of the electrode 108. In some embodiments, the insulator 150 is secured to the flanges 109 of the electrode 108 such that an inner diameter of the insulator 150 is in physical contact with the outer tips of the flanges 109. In some embodiments, the outer tips of the flanges 109 form a fluid seal with the inner diameter of the insulator 150 to prevent a fluid from traveling through the resulting interface. As shown, a step/protrusion 160 of the insulator 150 matingly engages at least one of the flanges 109 of the electrode 108 (e.g., the distal flange 109*b*) to prevent axial movement of the electrode 108 and the insulator 150 relative to each other. In general, the mating between the insulator 150 and the flanges 109 (achieved via one of snap fit, press fit or interference fit) can axially and radially align the two components. In some embodiments, the flanges 109 of the electrode 108, the insulator 150 and the external surface of the hollow body 210 of the electrode 108 cooperatively define a chamber 122. More specifically, the chamber 122 can be bounded axially by the flanges 109 and radially by the insulator 150 and the external surface of the electrode body 210.

In some embodiments, the insulator 150 is made from an electrically insulating material with an oxygen index of about 0.9 or higher to prevent combustion in a high-oxygen environment. For example, the electrically insulating material for constructing the insulator 150 can be fluorinated ethylene propylene (FEP) incorporating boron nitride powder. Other possible materials for forming the insulator 150 can be from the fluoro-polymer class, such as polytetrafluoroethylene (PTFE), Florescent, etc. In some embodiments, the insulator 150 is at least about 0.020 inches in thickness in the radial direction, such as about 0.030 inches thick.

As shown in FIG. 1, the insulator 150 in turn connects the electrode 108 to the nozzle 110, which will be described in detail below with respect to FIGS. 4*a* and 4*b*. More specifically, a proximal portion of the nozzle 110 is circumferentially disposed about the electrode 108 and physically connected to the electrode 108 via the insulator 150. To accomplish this, an exterior surface of the insulator 150 matingly engages an interior surface of the proximal portion of the nozzle body 110*a*. The mating between the insulator 150 and the nozzle body 110*a* can be one of snap fit, press fit or interference fit. The resulting interface between the two components axially and radially aligns the two components relative to each other. Further, because the insulator 150 is sandwiched between the electrode 108 and the proximal portion of the nozzle 110, the insulator 150 is adapted to radially and axially align the electrode 108 and the nozzle 110 relative to each other. In some embodiments, the connection between the electrode 108 and the nozzle 110 creates a plasma plenum 152 between the two components. More specifically, as shown in FIG. 1, the distal flange 109*b* and a distal portion of the exterior surface of the electrode 108 are shaped to complement a distal portion of the interior surface of the nozzle body 110*a* to cooperatively define the plasma plenum 152.

As shown in FIG. 1, the nozzle 110 in turn connects the electrode 108 (and the insulator 150) to the cartridge frame 112. More specifically, an outer diameter at the proximal portion of the nozzle 110 is matingly engaged to an inner diameter of the cartridge frame 112 to couple the electrode 108 and the insulator 150 to the cartridge frame 112. As described below in detail, the cartridge frame 112 can comprise an electrically insulating material with one or more fluid channels extending therethrough to provide liquid and/or gas between the torch head and the various consumable components of the cartridge 104 for desired torch processing.

More specifically, the proximal portion of the nozzle 110 is disposed within the central channel 420 of the cartridge frame 112 and secured to the cartridge frame 112 by matingly engaging (i) an exterior surface of the nozzle body 110*a* to an interior side surface of the cartridge frame 112 in the channel 420 to form an interface 162 and (ii) an exterior surface of the nozzle jacket 110*b* to an interior side surface of the cartridge frame 112 in the channel 420 to form the interface 164. These interfaces 162, 164, which can be formed by one of snap fit, press fit or interference fit, provide both axial and radial alignment of the nozzle 110 (along with other components attached to the nozzle 110) relative to the cartridge frame 112.

In some embodiments, a proximal portion of the shield 114, which will be described in detail below with respect to FIG. 3, substantially surrounds and couples to a distal portion of the nozzle 110. Further, the proximal portion of the shield 114 is disposed within the central channel 420 of the cartridge frame 112 and coupled to an inner side surface of the cartridge frame 112. More specifically, an outer diameter of the nozzle jacket 110*b* can be secured to an inner diameter of the shield 114 to form interface 166 via one of snap fit, press fit or interference fit. The resulting interface 166 between the nozzle 110 and the shield 114 can axially and radially align the two components relative to each other. In addition, an outer diameter at the proximal portion of the shield 114 can be secured to an inner diameter of the cartridge frame 112 within the central channel 420 to form interface 168 via one of snap fit, press fit or interference fit. The resulting interface 168 between the shield 114 and cartridge frame 112 can axially and radially align the two components relative to each other.

In general, the various interfaces among the electrode 109, insulator 150, nozzle 110, shield 114 and the cartridge frame 112 described above can be formed through one of snap fit, press fit, interference fit, crimping, frictional fitting, gluing, cementing or welding. In some embodiments, one or more sealing O-rings or gaskets, made of hardening epoxy or rubber for example, can be used at one or more of the interfaces. In some embodiments, these interfaces allow the electrode 108, insulator 150, nozzle 110 and/or shield 114 to align with and engage to one or more channels in the cartridge frame 112 such that these channels can conduct liquid and/or gas from the torch head, through the cartridge frame 112, to the desired consumable components.

Figure 2:
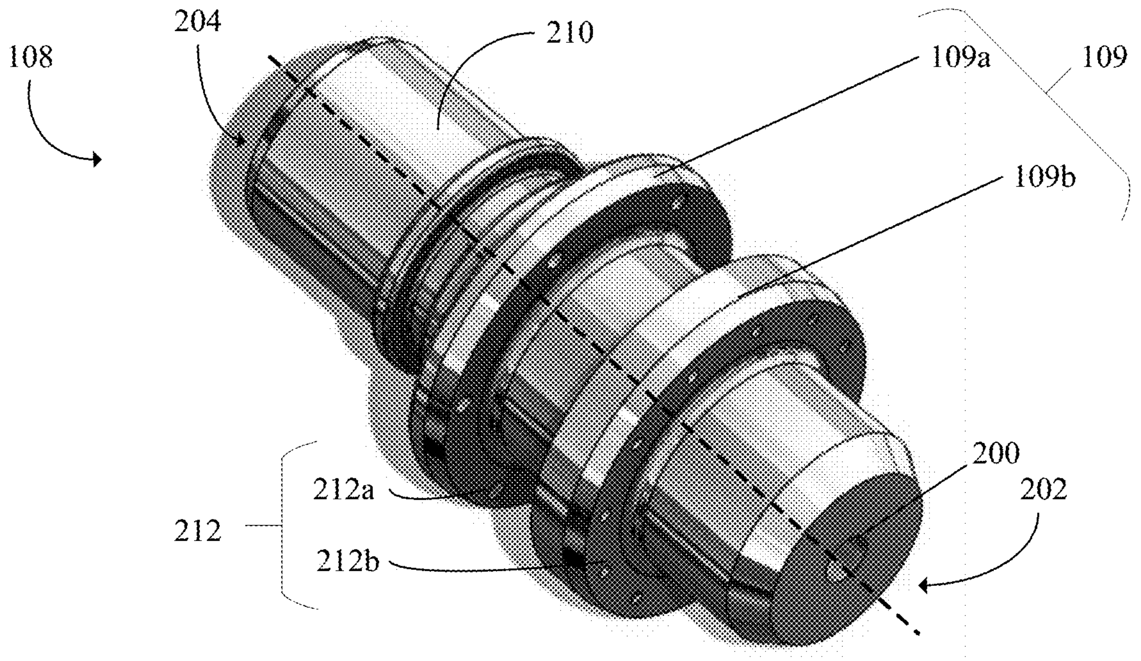
FIG. 2 shows an exemplary design of the electrode of the cartridge of FIG. 1, according to some embodiments of the present invention.

FIG. 2 shows an exemplary design of the electrode 108 of the cartridge 104 of FIG. 1, according to some embodiments of the present invention. The electrode 108 generally defines the substantially hollow body 210 having a proximal end 204 and a distal end 202 along the central longitudinal axis A of the cartridge 104. The electrode 108 can be made from an electrically conductive material, such as copper. The distal end 202 of the electrode 108 can include a bore 200 for receiving an emitter/insert so that an emission surface is exposed. The insert can be made of hafnium or other materials that possess suitable physical characteristics, including corrosion resistance and a high thermionic emissivity. In some embodiments, forging, impact extrusion, or cold forming can be used to initially form the electrode 108 prior to finish machining the component. As explained above, the electrode 108 can be disposed in and aligned with the main channel 420 of the cartridge frame 112. The electrode 108 can be connected to the cartridge frame 112 via the insulator 150 and the nozzle 110. In some embodiments, the electrode 108 is configured to be liquid cooled (e.g., the hollow body 210 of the electrode 108 is configured to conduct a liquid coolant therethrough).

The electrode 108 has multiple flanges 109, including the proximal flange 109*a* and the distal flange 109*b*, disposed circumferentially about the external surface of the hollow body 210 and extending radially outward. The flanges 109 generally increase the diameter of the electrode 108 relative to that of the hollow body 210 by about 50%, in some embodiments about 40%, in some embodiments about 35%. In some embodiments, the flanges 109 are axially located at the distal half of the electrode body 210 close to the distal end 202. For example, the flanges 109 can be axially located on the distal ⅓ portion of the electrode 108 close to the distal end 202. The distal flange 109*b* can be axially spaced and located downstream from the proximal flange 109*a* along the external surface of the hollow body 210. The proximal and distal flanges 109 cooperatively define (e.g., axially bound) the chamber 122, as shown in FIG. 1. The chamber 122 is also radially bounded by the external surface of the hollow body 210 of the electrode 108 and the insulator 150 surrounding at least a portion of the exterior surface of the hollow body 210. The flanges 109 include alignment surfaces at their tips to axially and radially align the electrode 108 relative to the insulator 150, which in turn axially and radially aligns the electrode 108 relative to the nozzle 110 and the cartridge frame 112 when installed in the cartridge 104. In some embodiments, each of the flanges 109 has a radial height of about 0.125 inches. In some embodiments, the proximal flange 109*a* and the distal flange 109*b* have differing axial thicknesses. For example, the proximal flange 109*a* can have an axial thickness of about 0.08 inches and the distal flange 109*b* can have an axial thickness of about 0.11 inches.

In addition, each flange 109 defines one or more holes 212 configured to conduct a gas flow therethrough along the external surface of the hollow body 210 toward the plasma plenum 152. These holes 212 are in fluid communication with the chamber 122 such that each hole 212 fluidly connects an exterior surface of the chamber to an interior surface of the chamber 122. In some embodiments, the tips of the flanges 109 form a fluid seal with the insulator 150 such that a fluid (e.g., a plasma gas) can only enter and exit the chamber 122 via the one or more holes 212 through the flanges 109. In some embodiments, the one or more holes 212*a* on the proximal flange 109*a* have a first combined cross-sectional flow area that is different from a second combined cross-sectional flow area defined by the one or more holes 212*b* on the distal flange 109*b*. For example, the first combined cross-sectional flow area can be larger than the second combined cross-sectional flow area to pressurize the chamber 122 by a gas flow entering the chamber 122 from the one or more holes 212*a* on the proximal flange 109*a* and leaving the chamber 122 from the one or more holes 212*b* on the distal flange 109*b*. In some embodiments, the cross-sectional flow area of each of the one or more holes 212*a* on the proximal flange 109*a* is between about 0.0015 $\text{inches}^2$ and about 0.0075 $\text{inches}^2$. In some embodiments, the cross-sectional flow area of each of the one or more holes 212*b* on the distal flange 109*b* is about 0.008 inches.

In some embodiments, the holes 212 on at least one of the proximal or distal flanges 109 are configured to introduce a swirling motion to the plasma gas flow therethrough. For example, the set of holes 212*b* on the distal flange 109*b* can be configured to provide the swirling motion, in which case the distal holes 212*b* can be axially offset by a certain distance (e.g., about 0048 inches). In operation, as a plasma gas flows distally through the holes 212*a* of the proximal flange 109*a* into the chamber 122, the proximal holes 212*a* are adapted to meter the plasma gas flow, i.e., restrict and control the gas flow to adjust the downstream pressure in the chamber 122. In addition, the difference between the first and second combined cross-sectional flow areas of the proximal holes 212*a* and the distal holes 212*b* controls the gas pressure buildup inside of the chamber 122. In some embodiments, the first combined cross-sectional flow area is larger than the second combined cross-sectional flow area associated with the two sets of holes 212*a,b* such that in the event of an arc extinguishing event (e.g., completion of a cut) the chamber 122 provides a built-in ramp-down effect on the pressure of the plasma gas flow as it exits the chamber 122 via the distal holes 212*b* of the distal flange 109*b*, which can also impart a swirling motion to the plasma gas flow. This built-in ramp-down effect is tailorable for different electrodes via selective variation in the comparative cross-sectional area and/or shape of sets of holes 212*a, b*. Therefore the holes 212 on the flanges 109 of the electrode 108 can be suitably configured to provide metering features and/or swirl features, thereby producing the desired pressure, speed, swirl direction, and overall consistency in the plasma plenum 152. This enables the electrode 108 to self-adjust the characteristics of the plasma gas flow to its own gas plenum 152, obviating the need for a separate swirl ring in the plasma arc torch and allowing manipulation of gas flow conditions (e.g., swirl, pressure, tailored ramp down, etc.) observed by the bore 200.

In an alternative embodiment of the electrode 108 (not shown), instead of having a plurality of flanges 109, the electrode 108 has only one flange 109 disposed circumferentially about an external surface of the hollow body 210 and extending radially outward, where the single flange 109 defines one or more holes 212 configured to conduct a gas flow therethrough. The tip of the flange 109 can form a sealing interface with the inner diameter of the insulator 150 to prevent fluid flow through their interface. Thus, the holes 212 of the flange 109 meter the gas flow that travels distally from the proximal end 204 of the electrode 108 to the gas plenum 152 at the distal end 202 of the electrode 108. In some embodiments, these holes 212 are also configured to generate a swirling pattern to the plasma gas flow by forming an axial offset through the flange 109.

In general, the electrode designs of the present invention provide one or more flanges 109 that align the electrode 108 with the nozzle 110 and other components of the cartridge 104 while enabling swirling and metering of the plasma gas to the plasma plenum 152. In some embodiments, the flange(s) 109 of the electrode 108 are integrally formed with the electrode 108 from a single piece of conductive material, such as copper. Alternatively, the flange(s) 109 are machined as a separate component and pressed onto the hollow body 210 of the electrode 108.

In some embodiments, the electrode 108 can further include a resilient element (not shown) circumferentially coupled to the proximal end 204 of the hollow body 210 of the electrode 108 for engaging and disengaging the electrode 108 to a torch body of the plasma arc torch without a threaded connection. Instead, the electrode 108 can be engaged/disengaged from the torch body via application of an axial force. More specifically, the resilient element allows the electrode 108 to be axially pushed on or pulled off relative to the torch head during engagement or disengagement, respectively, without the use of threading (or other clocking movement), thereby enabling the use of a tool-free and/or threadless electrode 108. In some embodiments, the resilient element is a Louvertac™ band. In some embodiments, the resilient element is electrically conductive and configured to provide an electrical connection between the electrode 108 and the torch head when the electrode 108 is engaged to the torch head. For example, the resilient element can facilitate conduction of electricity from a power supply (via the torch head) to a radially-extending/facing contact surface of the electrode 108 that is in physical contact with the resilient element 214 (e.g., the exterior surface of the electrode 108 adjacent to the proximal end 204), thereby establishing primary conduction of an operating current through the plasma arc torch.

Figure 3:
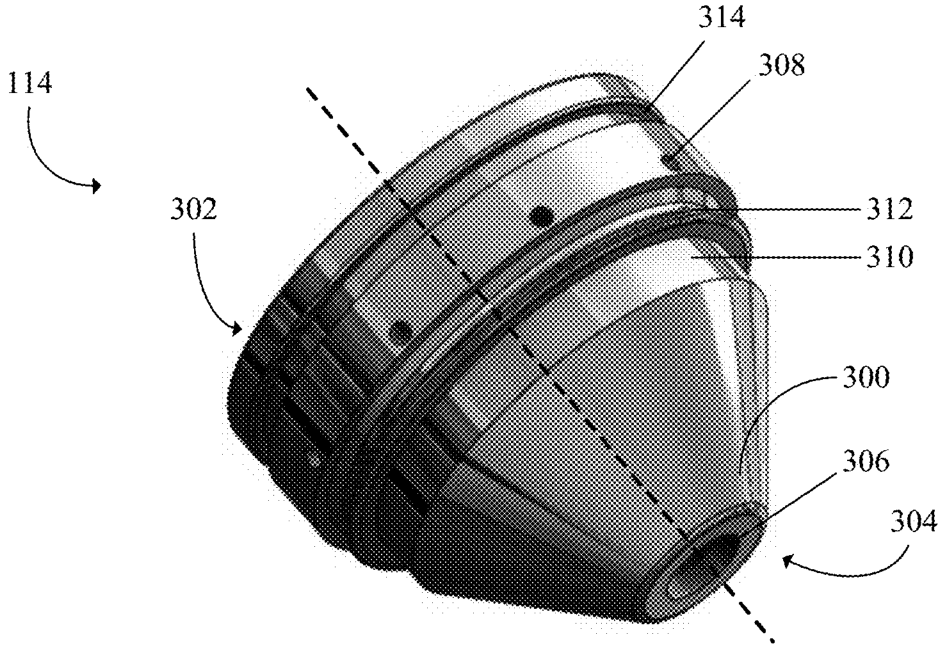
FIG. 3 shows an exemplary design of the shield of the cartridge of FIG. 1, according to some embodiments of the present invention.

FIG. 3 shows an exemplary design of the shield 114 of the cartridge 104 of FIG. 1, according to some embodiments of the present invention. The shield 114 comprises a substantially hollow body 300 with a proximal end 302 and a distal end 304. A centrally located shield exit orifice 306 is disposed at the distal end 304 of the shield body 300. Optionally, one or more gas vent holes (not shown) can extend from an interior surface to an exterior surface of the shield 114. The shield 114 can be cold formed or stamped using copper.

In some embodiments, the shield 114 includes a set of one or more swirl holes 308 circumferentially disposed around the hollow body 300 of the shield 114 near the proximal end 302. Each swirl hole 308 connects an interior surface to an exterior surface of the shield body 300 and is configured (e.g., canted) to impart a swirling motion to a gas flow therethrough. The swirl holes 308 are generally proximate to the interface 166 between the nozzle 110 and the shield 114 (as shown in FIG. 1) and located in the path of the shield gas flow in the cartridge 104 such that the swirl holes 308 can direct a shield gas flow to swirl proximate to the nozzle exit orifice 170.

In some embodiments, the shield 114 includes an engagement feature 310, such as a groove as shown, disposed into the hollow body 300 from the external surface of the shield 114, where the engagement feature 310 is configured to receive and engage with a complimentary feature (e.g., a step) of the shield retaining cap 180 (as shown in FIG. 1). The shield 114 can also include a groove 312 proximal to the engagement feature 310 for housing an O-ring 182 (as shown in FIG. 1) to form an interface between the external surface of the shield 114 and interior surface of the shield retaining cap 180. In some embodiments, the shield 114 further includes a groove 314 proximal to the groove 312 for housing another O-ring 184 (as shown in FIG. 1) to form an interface between the external surface of the shield 114 and an interior surface of the cartridge frame 112.

Figure 4A:
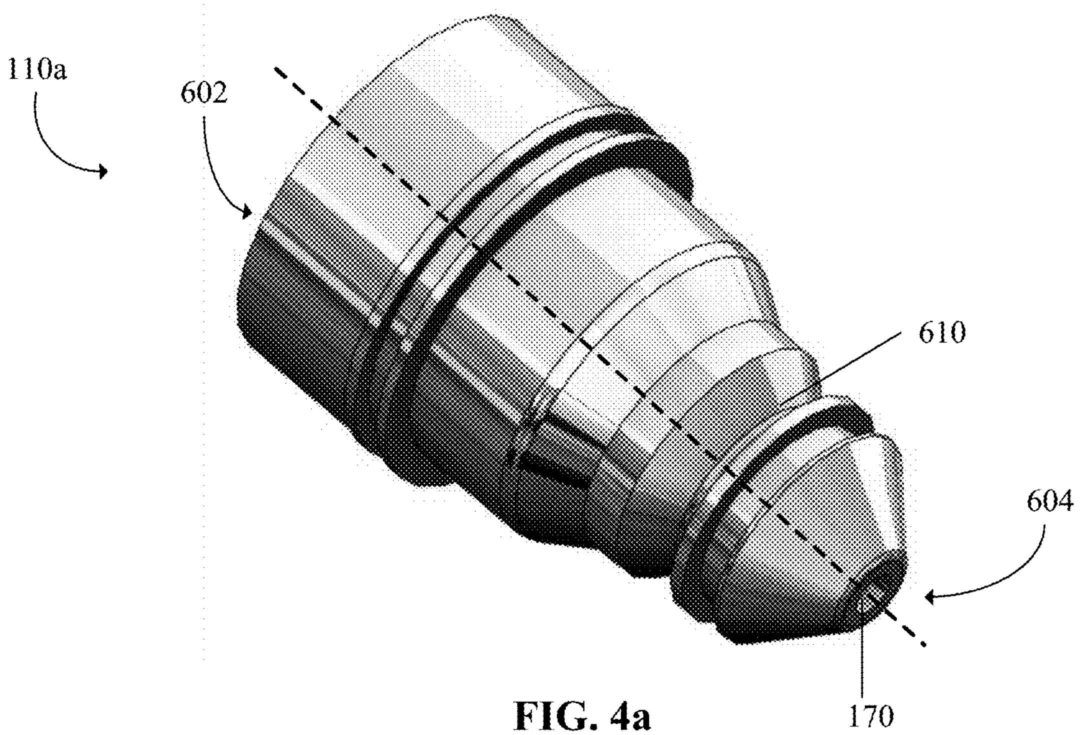
FIGS. 4*a* and 4*b* show an exemplary design of the inner nozzle body and the outer nozzle jacket, respectively, of the nozzle of the cartridge of FIG. 1, according to some embodiments of the present invention.
Figure 4B:
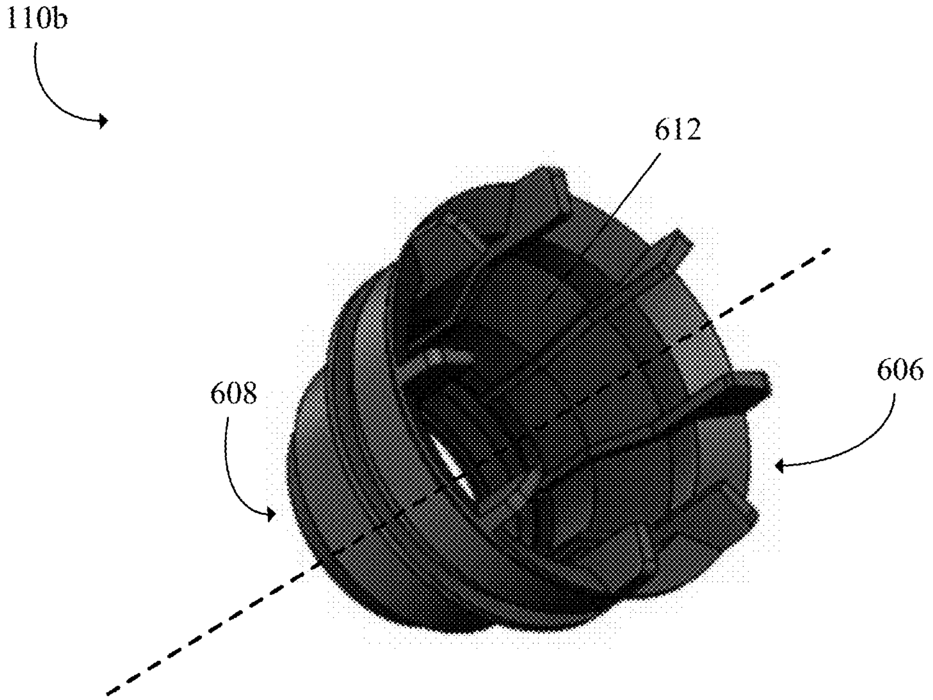

FIGS. 4*a* and 4*b* show an exemplary design of the inner nozzle body 110*a* and the outer nozzle jacket 110*b*, respectively, of the nozzle 110 of the cartridge 104 of FIG. 1, according to some embodiments of the present invention. As described above with respect to FIG. 1, the nozzle 110 includes the inner nozzle body 110*a* coupled to the outer nozzle jacket 110*b*. The inner nozzle body 110*a* is substantially hollow and configured to extend between a proximal end 602 and a distal end 604 along the longitudinal axis A. The nozzle jacket 110*b* is also substantially hollow and configured to extend between a proximal end 606 and a distal end 608 along the longitudinal axis A. The nozzle body 110*a* is adapted to be inserted into the hollow body of the nozzle jacket 110*b* such that the distal end 604 of the nozzle body 110*a* extends through the opening of the distal end 606 of the nozzle jacket 110*b*.

As shown in FIG. 4*a*, the distal end 604 of the nozzle body 110*a* includes the centrally-located nozzle exit orifice 170 for introducing a plasma arc, such as an ionized gas jet, to a workpiece (not shown) to be cut. In some embodiments, the nozzle body 110*a* includes a circumferential channel 610 etched into the external surface of the nozzle body 110*a* adjacent to the distal end 604. This circumferential channel 610, in cooperation with the corresponding inner surface of the nozzle jacket 110*b* when the nozzle body 110*a* is assembled with the nozzle jacket 110*b*, is adapted to circumferentially conduct a coolant flow therethrough to cool proximate to the nozzle exit orifice 170, as described below in detail in relation to FIGS. 11*a* and 11*b*. As shown in FIG. 4*b*, the nozzle jacket 110*b* includes a plurality of parallel axial passageways 612 dispersed around the inner diameter of the nozzle jacket 110*b*, where each axial passageway 612 extends from the proximal end 606 to the distal end 608 of the nozzle jacket 110*b*. When the nozzle body 110*a* is assembled with the nozzle jacket 110*b*, these passageways 612 in cooperating with the corresponding outer surface of the nozzle body 110*a*, can axially conduct a coolant flow between the nozzle body 110*a* and the nozzle jacket 110*b* to/from the circumferential channel 610, as described below in detail in relation to FIGS. 11*a* and 11*b*.

Figure 5A:
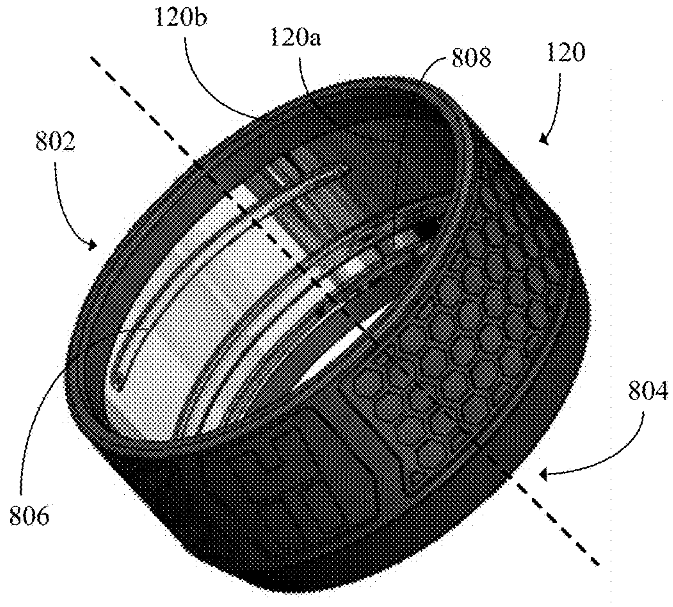
FIG. 5*a* shows an exemplary design of the retaining cap of the cartridge of FIG. 1, including an inner retaining cap piece shown in FIG. 5*b*, according to some embodiments of the present invention.
Figure 5B:
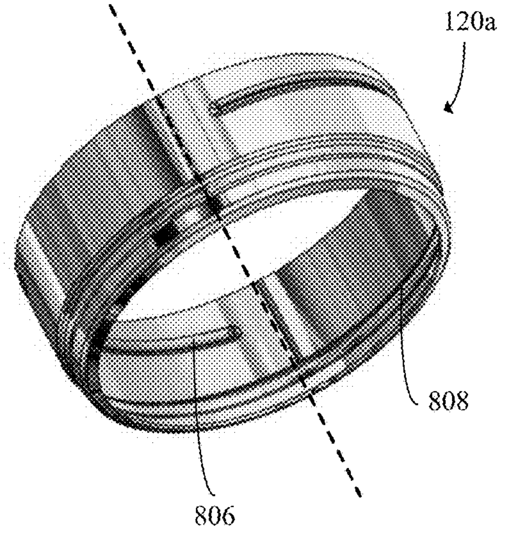

FIG. 5*a* shows an exemplary design of the retaining cap 120 of the cartridge 140 of FIG. 1, including an inner retaining cap piece 120*a* shown in FIG. 5*b*, according to some embodiments of the present invention. The retaining cap 120 has a substantially hollow body extending between a proximal end 802 and a distal end 804 along the longitudinal axis A. As shown, the retaining cap 120 generally comprises two pieces, an outer retaining cap piece 120*b* substantially surrounding the inner retaining cap piece 120*a*, where the outer retaining cap piece 120*b* can be made from an electrically non-conductive material and the inner retaining cap 120*a* can be made from an electrically conductive material (e.g., brass). In some embodiments, the inner retaining cap 120*a* is stamped. As shown, the inner retaining cap 120*a* can include an engagement feature 806 (e.g., groove, thread or step) circumferentially disposed at the proximal end 802 to capture the torch head against the retaining cap 120. In addition, the inner retaining cap 120*a* can include another engagement feature 808 (e.g., groove, thread or step) disposed on an internal surface at the distal end 804 to capture the shield retaining cap 180, which in turn captures the cartridge 104 against the retaining cap 120. Upon engaging of the cartridge 104 with the torch head, the retaining cap 120 can securely and circumferentially surround (i) an external surface of the torch head via the engagement feature 806 and (ii) an external surface of the proximal end of the cartridge 104 via the engagement feature 608. As shown in FIGS. 5*a* and 5*b*, the engagement feature 806 can be one or more threads for engaging the torch head and the engagement feature 808 can be a groove for engaging the shield retaining cap 180 via an interference fit, for example. In general, various engagement methods between the torch head 102 and the cartridge 104 are possible, including threading, snap fit, interference fit, crimping, etc.

In some embodiments, the retaining cap 120 is provided as a part of the torch head. In some embodiments, the retaining cap 120 is provided as a part of the cartridge 104. In some embodiments, the retaining cap 120 is provided as a distinct component separate from the cartridge 104 or torch head.

Figure 6:
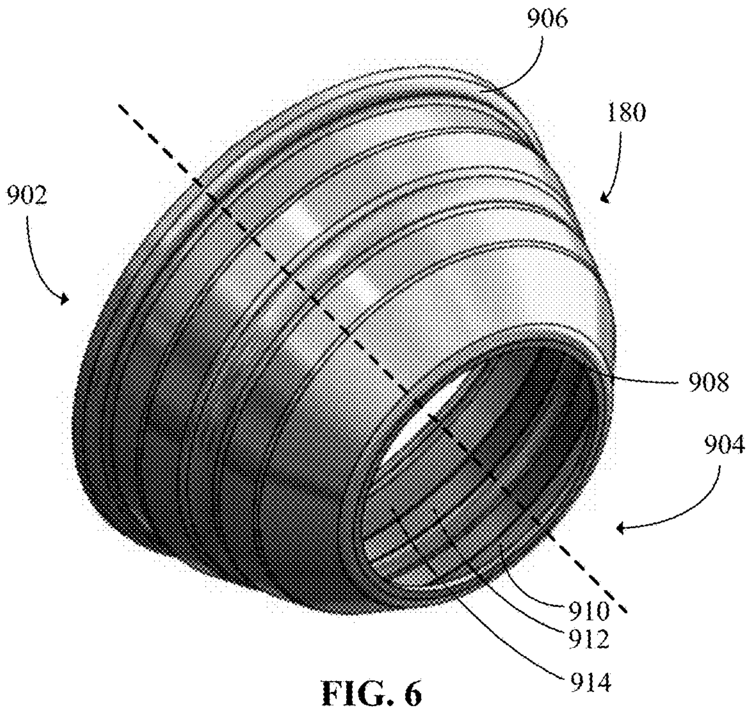
FIG. 6 shows an exemplary design of the shield retaining cap of the cartridge of FIG. 1, according to some embodiments of the present invention.

FIG. 6 shows an exemplary design of the shield retaining cap 180 of the cartridge 140 of FIG. 1, according to some embodiments of the present invention. The shield retaining cap 180 has a substantially hollow body extending between a proximal end 902 and a distal end 904 along the longitudinal axis A. The shield retaining cap 180 can be made from an electrically conductive material (e.g., brass) using molding or stamping, for example. As shown, the shield retaining cap 180 can include an engagement feature 906 (e.g., groove, thread or step) circumferentially disposed at the proximal end 902 to couple to the complimentary engagement feature 808 of the retaining cap 120. For example, the engagement feature 906 can be a raised band 906 designed to fit into the groove 808 via an interference fit to engage the shield retaining cap 180 with the retaining cap 120. The shield retaining cap 180 can also include another engagement feature 908 (e.g., groove, thread or step) circumferentially disposed at the proximal end 904 to couple to the complimentary engagement feature 310 of the shield 114 (shown in FIG. 3). For example, the engagement feature 908 can be a step configured to form an interference fit within the groove 310 of the shield 114.

In some embodiments, the interior surface of the shield retaining cap 180 includes one or more circumferential grooves configured to house one or more O-ring seals for engaging with the cartridge frame 112 and/or the shield 114. As shown, the distal end 904 of the shield retaining cap 180 can include a circumferential groove 910 disposed into its interior surface for housing the O-ring 182 (shown in FIG. 1) in cooperation with the circumferential groove 312 on the exterior surface of the shield 114. The resulting interface further retains the shield retaining cap 180 to the shield 114 while forming a fluid seal therebetween. In some embodiments, a middle portion of the shield retaining cap 180 can include a circumferential groove 912 disposed into its interior surface for housing an O-ring 186 (shown in FIG. 1) in cooperation with the exterior surface of the cartridge frame 112. The resulting interface engages the shield retaining cap 180 to the cartridge frame 112 while forming a fluid seal therebetween. As shown in FIG. 1, the O-ring seal 186 between the shield retaining cap 180 and the cartridge frame 112 can be made at an angle (e.g., in a static compression seal design) to accommodate the angled shape of the shield retaining cap 180 at that location. In some embodiments, the proximal end 902 of the shield retaining cap 180 can include yet another circumferential groove 914 disposed into its interior surface for housing another O-ring 188 (shown in FIG. 1) in cooperation with the exterior surface of the cartridge frame 112. The resulting interface further engages the shield retaining cap 180 to the cartridge frame 112 while forming a fluid seal therebetween.

Figure 7A:
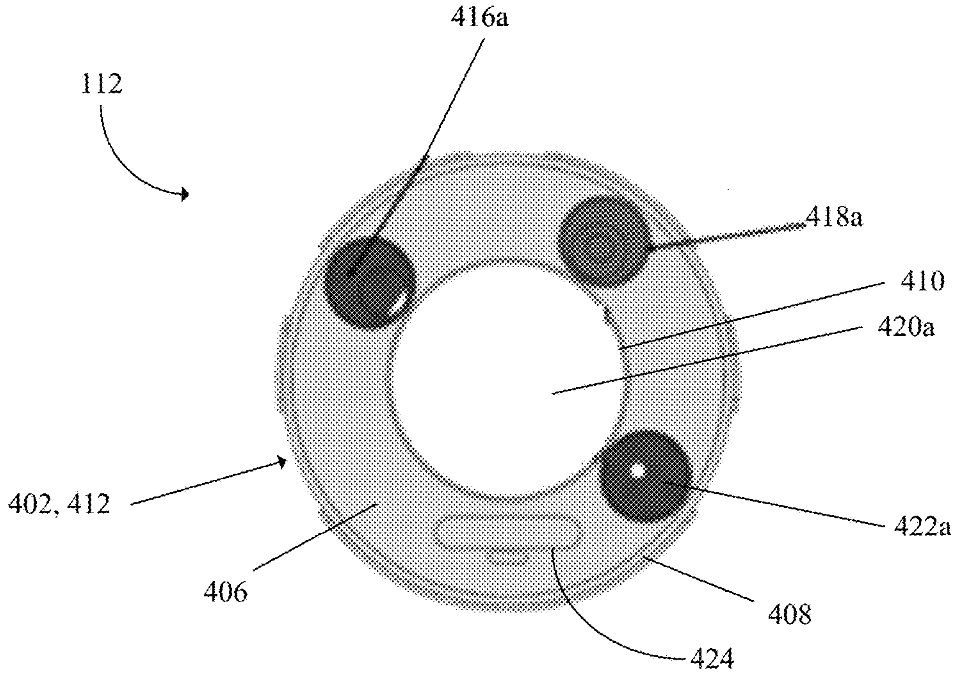
FIGS. 7*a*-7*c* show a proximal end view, a profile view and a sectional view, respectively, of an exemplary design of the cartridge frame of the cartridge of FIG. 1, according to some embodiments of the present invention.
Figure 7B:
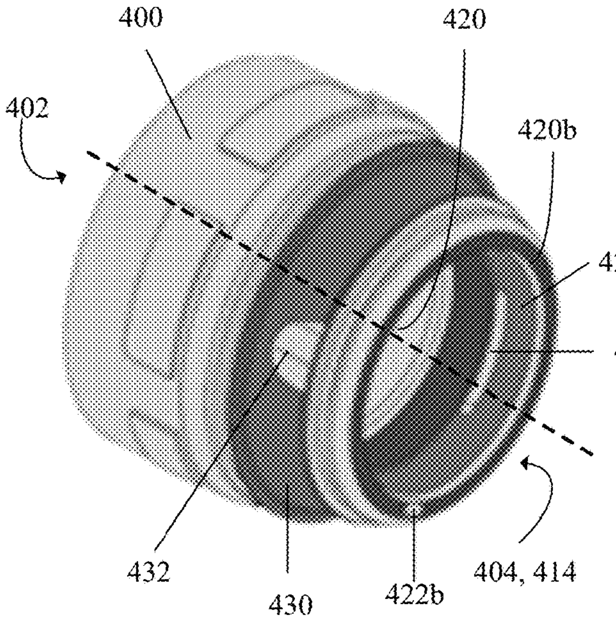
Figure 7C:
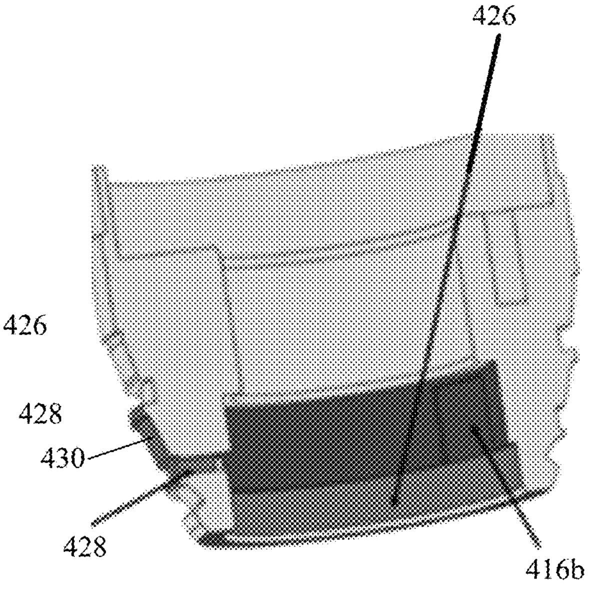

FIGS. 7*a*-7*c* show a proximal end view, a profile view and a sectional view, respectively, of an exemplary design of the cartridge frame 112 of the cartridge 104 of FIG. 1, according to some embodiments of the present invention. The cartridge frame 112 includes a generally cylindrical insulator body 400 axially extending between a proximal end 402 and a distal end 404. The proximal end 402 of the cartridge frame 112 defines a first end face 412 (shown in FIG. 7*a*) and the distal end 404 of the cartridge frame 112 defines a second end face 414 (shown in FIG. 7*b*). The insulator body 400 of the cartridge frame 112 is also defined by an inner region 406, an outer side surface 408 and an inner side surface 410 surrounding and forming the main channel 420. In some embodiments, the cartridge frame 112 is made via thermoplastic molding. In some embodiments, one or more portions of the cartridge frame 112 are machined. In some embodiments, the cartridge frame 112 has a material composition similar to that of the insulator 150 and/or the inner retaining cap 120*a*.

As shown in FIG. 7*a*, the end face 412 of the proximal end 402 of the cartridge frame 112 comprises (i) a large central opening 420*a*, (ii) a liquid coolant inlet opening 416*a* for conducting a liquid coolant flow into the cartridge 104, (iii) a liquid coolant outlet opening 418*a* for conducting a liquid coolant flow out of the cartridge 104, and (iv) a shield gas inlet opening 422*a* for conducting a shield gas flow into the cartridge frame 112. In general, these openings are configured to be in fluid communication with their corresponding openings on the distal end of the torch head once the torch head is aligned with and connected to the cartridge 104 to exchange various fluid flows through the plasma arc torch. In some embodiments, the coolant inlet opening 416*a* and the coolant outlet opening 418*a* are radially offset on the proximal end face 412 from one another but can be located on the same half of the proximal end face 412. The shield gas inlet opening 422*a* can be located on the other half of the proximal end face 412. In some embodiments, the proximal end face 412 further includes an opening 424 to a cavity located in the inner region 406 of the insulator body 400, where the cavity is configured to house a signal device (e.g., a radio-frequency identification tag) for storing and transmitting information about the cartridge 104 (e.g., about the electrode 108, the nozzle 110, the shield 114, the cartridge frame 112 itself, a process setting, etc.) to an adjacent reader device (not shown), such as to a reader device in the torch head. More specifically, the signal device can be disposed into the cavity via the opening 424 and embedded by the insulator material of the cartridge frame body 400. As shown in FIG. 7*b*, the end face 414 at the distal end 404 of the cartridge frame 112 comprises (i) a large central opening 420*b* and (ii) a shield gas outlet opening 422*b* for conducting a shield gas flow away from the cartridge frame 112.

In some embodiments, the central channel 420 of the cartridge frame 112 extends substantially parallel to the longitudinal axis A connecting the central opening 420*a* on the proximal end face 412 of the cartridge frame 112 to the central opening 420*b* on the distal end face 414 of the cartridge frame 112. The central channel 420 can substantially surround and be symmetrical about the central longitudinal axis A. As described above with reference to FIG. 1, the central channel 420 of the cartridge frame 112 is configured to house the electrode 108, the insulator 150, a proximal portion of the nozzle 110 and a proximal portion of the shield 114. For example, the nozzle 110 and the shield 114 can be directly coupled to the inner side surface 410 of the cartridge frame 112, while the electrode 108 and the insulator 150 can be indirectly coupled to the inner side surface 410 via the nozzle and/or the shield 114.

Figure 9:
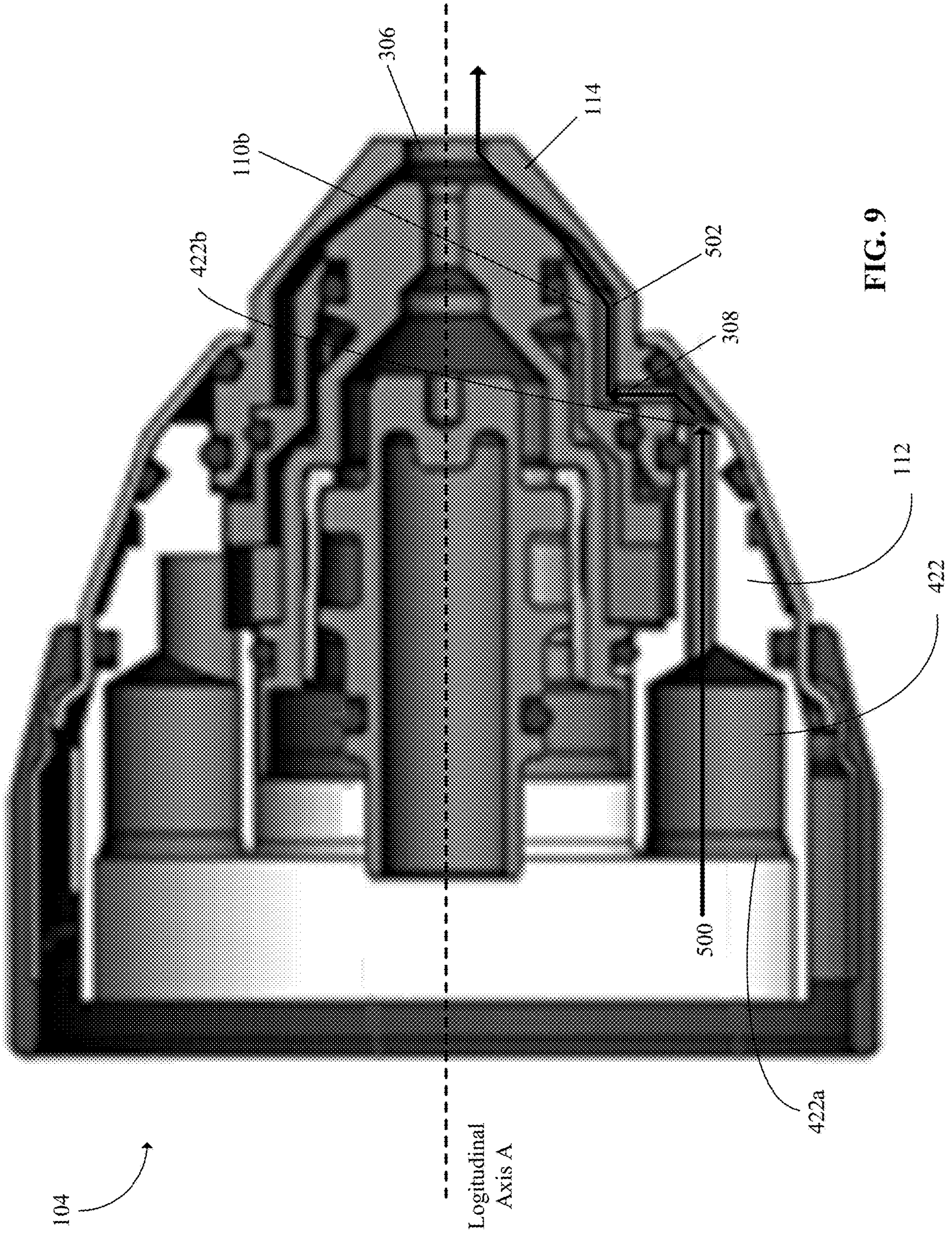
FIG. 9 shows a sectional view of the cartridge of FIG. 1 oriented to illustrate an exemplary shield gas flow path via the cartridge frame, according to some embodiments of the present invention.

In some embodiments, the cartridge frame 112 includes a shield gas channel 422 (as shown in FIG. 9) configured to direct a shield gas flow from the torch head to the shield 114 of the cartridge 104. The shield gas channel 422 connects the opening 422*a* on the proximal end face 412 of the cartridge frame 112 to the opening 422*b* on the distal end face 412 of the cartridge frame 112. In some embodiments, the shield gas channel 422 extends substantially parallel to the longitudinal axis A in the inner region 406 of the insulator body 400 of the cartridge frame 112, but is offset from the central longitudinal axis A (i.e., non-concentric with respect to the longitudinal axis A). In some embodiments, the shield gas channel 422 is configured to provide a metering function to the shield gas flow therein. For example, the diameter of the shield gas channel 422 can vary over the length of the channel to provide the metering function (as illustrated in FIG. 9). The diameter of the shield gas channel 422 at the distal end 404 of the cartridge frame 112 can be about half of the diameter of the shield gas channel 422 at the proximal end 402 of the cartridge frame 112 to reduce the flow rate of the shield gas flow.

Figure 8B:
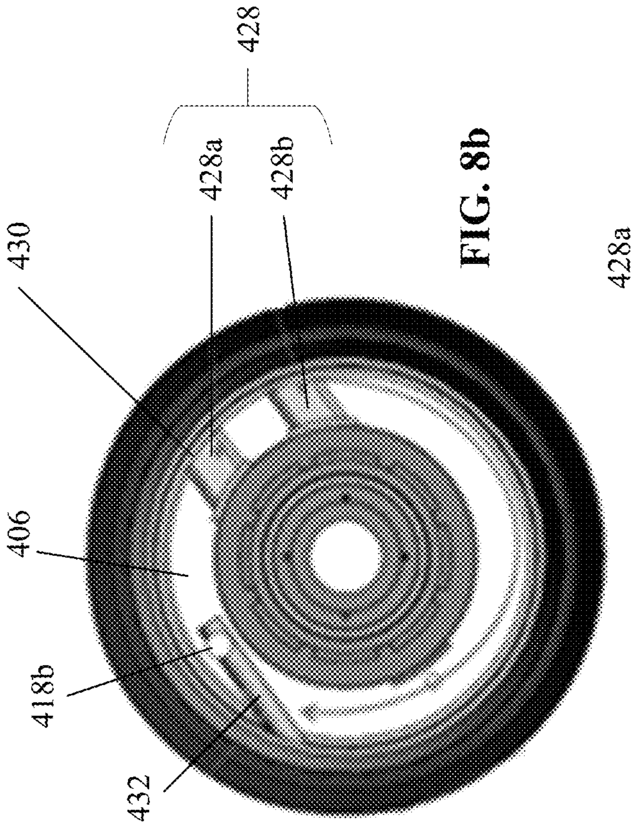
FIGS. 8*a*-8*c* show a sectional view, a sectional end view and a perspective view, respectively, of portions of the cartridge illustrating various distal coolant channel openings and passageways embedded in the cartridge frame, according to some embodiments of the present invention.
Figure 8C:
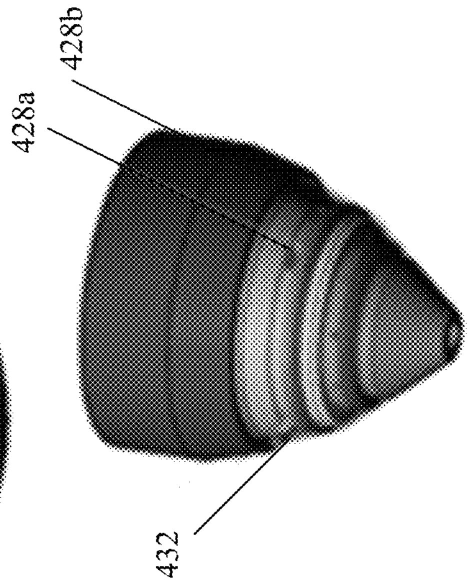
Figure 8A:
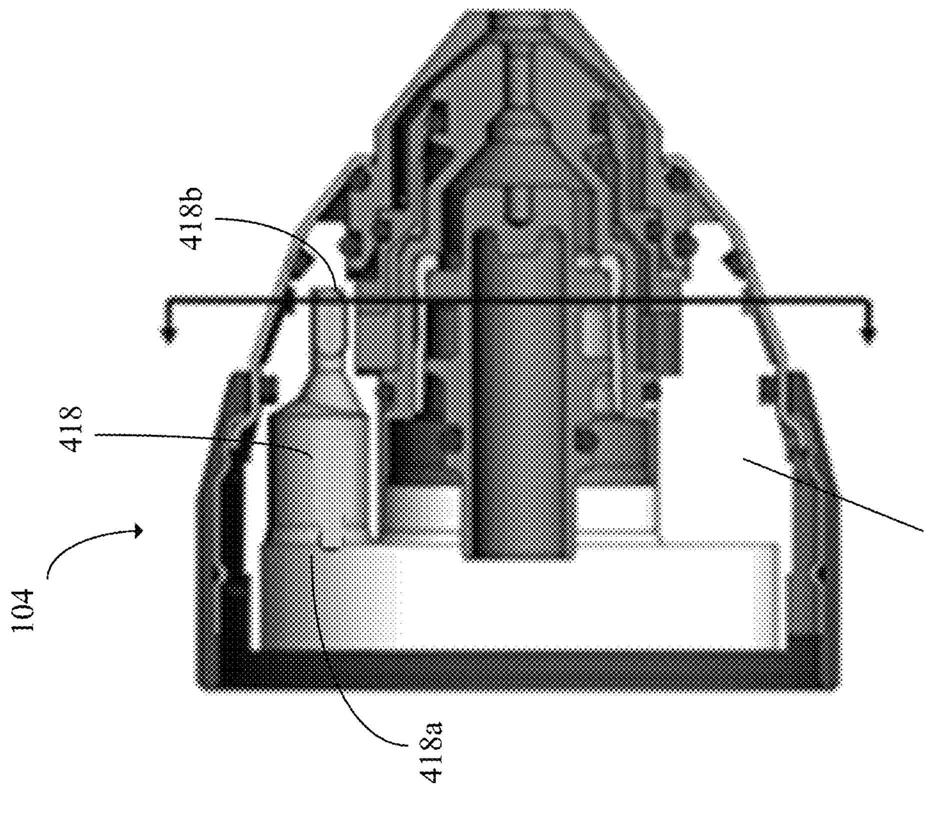

The cartridge frame 112 can also include a plurality of channels and passageways for directing a coolant flow through the cartridge 104. FIGS. 8*a*-8*c* show a sectional view, a sectional end view and a perspective view, respectively, of portions of the cartridge 104 (including the cartridge frame 112) illustrating various distal coolant channel openings and passageways embedded in the cartridge frame 112, according to some embodiments of the present invention. These coolant channels and passageways of the cartridge frame 112 are described below with reference to FIGS. 7*a*-7*c* and 8*a*-8*c*.

Figure 11A:
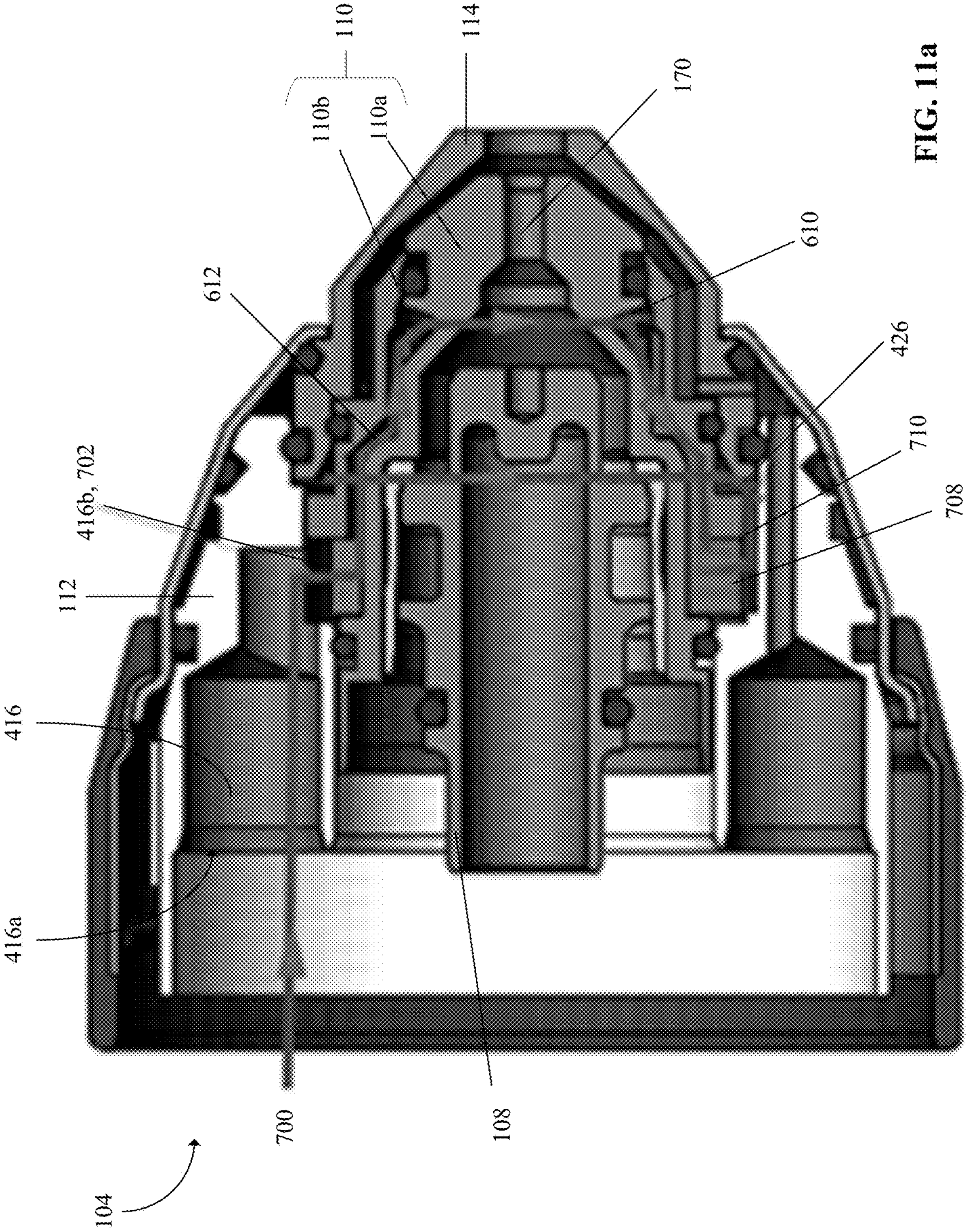
FIGS. 11*a* and 11*b* show a sectional view of the cartridge of FIG. 1 oriented to illustrate an exemplary liquid coolant flow path through the cartridge in a series of flow segments, according to some embodiments of the present invention.

In some embodiments, the cartridge frame 112 includes an inlet coolant channel 416 (as shown in FIG. 11*a*) configured to direct a coolant flow from the torch head to the nozzle 110 of the cartridge 104. The inlet coolant channel 416 connects the opening 416*a* on the proximal end face 412 of the cartridge frame 112 to an opening 416*b* (shown in FIG. 7*c*) disposed on the inner side surface 410 of the cartridge frame 112. Thus the inlet coolant channel 416 does not extend through the entire axial length of the cartridge frame 112 in the longitudinal direction. In some embodiments, the opening 416*b* is located in a middle portion of the cartridge frame 112 on the inner side surface 410 and aligned with an opening in the nozzle 110, such as an opening between the inner nozzle body 110*a* and the outer nozzle jacket 110*b* (as shown in FIG. 11*a*). In some embodiments, the inlet coolant channel 416 extends substantially parallel to the longitudinal axis A in the inner region 406 of the insulator body 400 of the cartridge frame 112, but offset from the central longitudinal axis A (i.e., non-concentric with respect to the longitudinal axis A).

In some embodiments, as illustrated in FIGS. 7*b* and 7*c*, the cartridge frame 112 includes an inner circumferential coolant channel 426 disposed on the inner surface 410 of the cartridge frame 112 adjacent to the distal end face 414. As described below in detail in relation to FIGS. 11*a* and 11*b*, the inner circumferential coolant channel 426, in cooperation with the nozzle jacket 110*b* and the shield 114, is configured to circulate a coolant flow around the inner surface 410 of the cartridge frame 112 while cooling the proximal end 302 of the shield 114.

In some embodiments, as illustrated in FIGS. 8*a*-8*c*, the cartridge frame 112 includes one or more radial coolant passageways 428 that fluidly connect the inner circumferential coolant channel 426 on the inner surface 410 of the cartridge frame 112 to an outer circumferential coolant channel 430 disposed on the outer surface 408 of the cartridge frame 112. As described below in detail in relation to FIGS. 11*a* and 11*b*, the outer circumferential coolant channel 430, in cooperation with the shield retaining cap 180, is configured to circulate a coolant flow around the outer surface 408 of the cartridge frame 112 while cooling the shield retaining cap 180. In some embodiments, as shown in FIGS. 8*a*-8*c*, there are two radial coolant passageways 428*a*, 428*b* for conducting the coolant flow to the shield retaining cap 180 (i.e., from the inner circumferential coolant channel 426 to the outer circumferential coolant channel 430). In alternative embodiments, as shown in FIG. 7*b*, there is a single long radial coolant passageway 428 for conducting the coolant flow to the shield retaining cap 180 and then out of the cartridge 104.

Figure 11B:
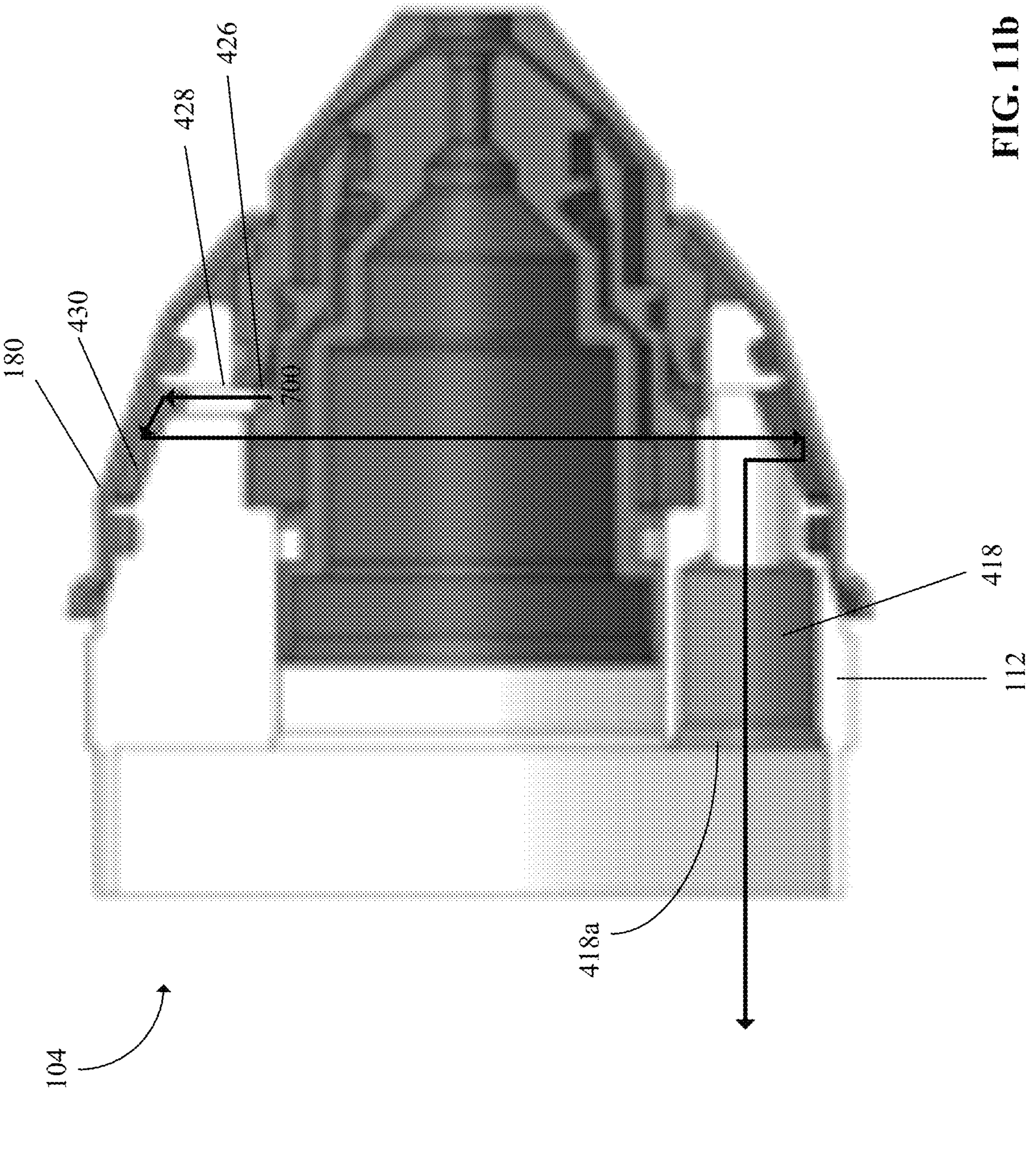

In some embodiments, as illustrated in FIGS. 8*a*-8*c*, the cartridge frame 112 includes at least one radial coolant passageway 432 that fluidly connects the outer circumferential coolant channel 430 disposed on the outer surface 408 of the cartridge frame 112 to an opening 418*b* in the interior region 406 of the cartridge frame 112, which is in fluid communication with an outlet coolant channel 418 (as shown in FIG. 11*b*). The outlet coolant channel 418 connects the opening 418*b* disposed in the cartridge frame 112 to the opening 418*a* on the proximal end face 412 of the cartridge frame 112 and is configured to direct the coolant flow from the outer circumferential coolant channel 430 out of the cartridge frame 112 via the opening 418*a* on the proximal end face 412 of the cartridge frame 112 into the torch head. The outlet coolant channel 418 can be disposed in the inner region 406 of the insulator body 400 of the cartridge frame 112 and substantially parallel to the longitudinal axis A, but offset from the central longitudinal axis A (i.e., non-concentric with respect to the longitudinal axis A).

In some embodiments, as illustrated in FIGS. 8*a*-8*c*, the distal opening 418*b* of the outlet coolant channel 418 is offset about 180 degrees from (i.e., radially opposite to) the one or more radial coolant passageways 428 that introduces the coolant flow into the outer circumferential coolant channel 430. This offset arrangement allows the coolant flow to travel around in the outer circumferential channel 430 to comprehensively cool the shield retaining cap 180 before being exhausted from the cartridge frame 112.

In some embodiments, the proximal end 402 of the cartridge frame 112 has a skirt with alignment features that matingly engage the torch head and begin axial alignment of the cartridge 104, torch head, and ports prior to thread engagement. Once the skirt is bottomed out about the torch head and the threads of the cartridge 104 are spun to engage the torch head, thread engagement is achieved as the coolant and gas ports are aligned. In this manner, the cartridge 104 and the cartridge frame 112 provide for multi-step rough to fine alignment connection.

In another aspect, the cartridge 104 includes multiple gas ports for directing different gas flows, such as a shield gas flow and a plasma gas flow, received from the torch head to the cartridge 104 to support a plasma arc process. FIG. 9 shows a sectional view of the cartridge 104 of FIG. 1 oriented to illustrate an exemplary shield gas flow path 500 via the cartridge frame 112, according to some embodiments of the present invention. Exemplary shield gases include air, oxygen (i.e. $O_2$), and argon. In some embodiments, the shield gas flow path 500 and channels described herein are also compatible with conducting a shield fluid, such as water and/or mist, from the torch head to and through the cartridge 104.

In operation, upon engagement between the torch head and the cartridge 104, the shield gas flow 500 can enter the shield gas channel 422 of the cartridge frame 112 via the shield gas inlet opening 422*a* on the proximal end face 412 of cartridge frame 112. The gas 500 flows distally through the shield gas channel 422 and exits the cartridge frame 112 from the shield gas outlet opening 422*b* on the distal end face 414 of the cartridge frame 112. As shown, the shield gas outlet opening 422*b* is fluidly connected to a gas passage 502 between the shield 114 and the nozzle 110 (i.e., the jacket 110*b* of the nozzle 110) via the swirl holes 308 disposed in the body 300 of the shield 114. Thus, upon the shield gas flow 500 exiting from the shield gas outlet opening 422*b*, the shield gas flow enters a shield gas passage 502 between the shield 114 and the nozzle 110 via the shield swirl holes 308 to cool both the nozzle 110 and the shield 114. The shield gas 500 is adapted to exit the cartridge 104 via the shield exit orifice 306. Further, the swirl holes 308 on the shield gas flow path 500 allows the shield gas to swirl proximate to the nozzle exit orifice 170. For the shield gas flow path 500, shield gas swirling (at the swirl holes 308) is performed downstream of shield cooling, proximate to the distal tip 16 of cartridge 104 at a reduced diameter and relative to the bore.

Figure 10:
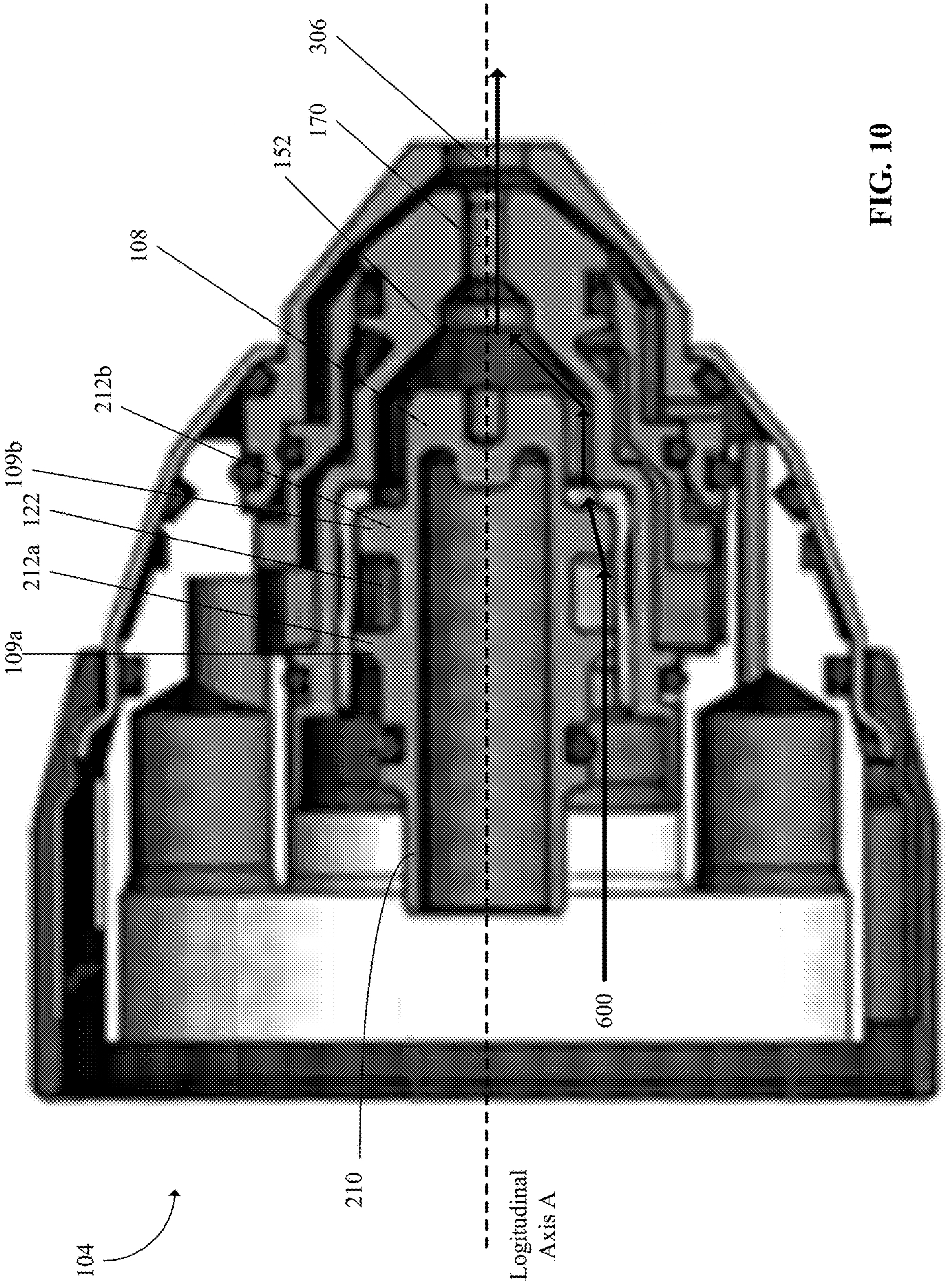
FIG. 10 shows a sectional view of the cartridge of FIG. 1 oriented to illustrate an exemplary plasma gas flow path, according to some embodiments of the present invention.

FIG. 10 shows a sectional view of the cartridge 104 of FIG. 1 oriented to illustrate an exemplary plasma gas flow path 600, according to some embodiments of the present invention. Upon engagement between the torch head and the cartridge 104, the plasma gas flow 600 can enter the cartridge 104 by flowing distally over the exterior surface of the hollow body 210 of the electrode 108. The plasma gas flow 600 then enters the gas chamber 122 via the set of one or more proximal holes 212*a* disposed in the proximal flange 109*a* of the chamber 122, where the proximal holes 212*a* are configured to meter the shield gas flow 600. The plasma gas 600 then flows distally out of the chamber 122 through the set of one or more distal holes 212*b* disposed in the distal flange 109*b* of the chamber 122, where the distal holes 212*b* can impart a swirling motion to the plasma gas flow 600. Alternatively, if the electrode 108 only has only one flange 109 (not shown), the plasma gas flow 600 is adapted to flow distally through the one or more holes 212 disposed in the single flange 109, where the holes 212 can provide metering and/or swirling functions. In another alternative embodiment, proximal holes 212*a* are configured to impart swirl and distal holes 212*b* are configured to meter the flow. The plasma gas flow 600 then enters the plasma plenum 152, flows distally through the plasma plenum 152, and exits the cartridge 104 via the central nozzle exit orifice 170 and the central shield exit orifice 306.

In some embodiments, the shield gas flow 500 and the plasma gas flow 600 are fluidly isolated from each other in the cartridge 104 such that these gases do not cross paths or share the same channels. As shown, the shield gas flow 500 is directed by the cartridge frame 112 to flow in the shield gas passage 502 between the outer nozzle jacket 110*b* and the shield 114, while the plasma gas flow 600 does not enter/directly contact the cartridge frame 112 and flows between the electrode 108 and the inner nozzle body 110*a*.

In another aspect, the cartridge 104 includes a multi-directional coolant path about the various components of the cartridge 104 to efficiently cool the cartridge 104. Exemplary liquid coolant includes water, propylene glycol, ethylene glycol, or any number of commercially available coolants specially designed for plasma cutting systems. FIGS. 11*a* and 11*b* show a sectional view of the cartridge 104 of FIG. 1 oriented to illustrate an exemplary liquid coolant flow path 700 through the cartridge 104 in a series of flow segments, according to some embodiments of the present invention.

In some embodiments, a separate coolant flow (not shown) is directly supplied from the torch head to the electrode 108 prior to circulating the coolant back to the torch head and supplying the coolant to the cartridge frame 112 again to cool the remaining components of the cartridge 104. The coolant flow 700 illustrated in FIGS. 11*a* and 11*b* depicts only the latter portion of the coolant flow via the cartridge frame 112 for cooling components of the cartridge 104.

As shown in FIG. 11*a*, the coolant 700 enters the cartridge frame 112 via the coolant inlet opening 416*a* at the proximal end face 412 of the cartridge frame 112 and flows distally through the cartridge frame 112 over the inlet coolant channel 416 to reach the distal opening 416*b* on the inner side surface 410 of the cartridge frame 112. The opening 416*b* fluidly connects the inlet coolant channel 416 in the cartridge frame 112 to a nozzle inlet 702 on one side of the nozzle 110. Specifically, the nozzle inlet 702 can be located between the inner nozzle body 110*a* and the outer nozzle jacket 110*b* on one side of the nozzle 110 such that it introduces the coolant flow 700 between the two nozzle components into one of the passageways 612 between an exterior surface of the nozzle body 110*a* and an interior surface of the nozzle jacket 110*b*. As the coolant flow 700 is conducted distally through the passageway 612 via the nozzle inlet 702, it substantially cools one side of the nozzle 110 between the nozzle body 110*a* and the nozzle jacket 110*b*. Upon reaching close to the distal end 604 of the nozzle body 110*a*, the coolant flow 700 can swirl around at least a portion of a circumference of the nozzle body 110*a* via the circumferential channel 610 disposed between the nozzle body 110*a* and the nozzle jacket 110*b* (e.g., etched into the external surface of the nozzle body 110*a*) to cool proximate to the nozzle exit orifice 170. The coolant flow 700 then returns proximally on a different side of the nozzle 110 within another one of the passageways 612 and exits the nozzle 110 via a nozzle outlet 708 located between the inner nozzle body 110*a* and the outer nozzle jacket 110*b*. In some embodiments, the nozzle outlet 708 is about 180 degrees radially offset from the nozzle inlet 702 through which the coolant flow 700 is first introduced into the nozzle 110.

The nozzle outlet 708 is in turn fluidly connected to a passageway 710 that is cooperatively defined by an exterior surface of the nozzle jacket 110*b* and a portion of the inner side surface 410 of the cartridge frame 112. As the coolant flow 700 emerges from the nozzle outlet 708, the coolant flow 700 travels distally within the passageway 710 until it physically contacts the proximal end of the shield 114 that is inserted within the cartridge frame 112, at which location the coolant flow 700 is adapted to travel circumferentially about the distal end of the shield 114 in the inner circumferential channel 426 disposed in the inner side surface 410 of the cartridge frame 112.

As shown in FIG. 11*b*, the coolant flow 700 is adapted to circulate within the inner circumferential channel 426 and exit the inner circumferential channel 426 from the other side of the inner side surface 410 of the cartridge frame 112, at which point the coolant flow 700 is conducted from the inner side surface 410 of the cartridge frame 112 to the outer side surface 408 of the cartridge frame 114 via the radial passage 428. Thus, the radial passage 428 transfers the coolant flow 700 from the shield cooling to cooling the shield retaining cap 180. Further, as explained above, the radial passageway 428 is in fluid communication with the outer circumferential coolant channel 430 cooperatively defined by the outer side surface 408 of the cartridge frame 112 and the inner surface of the shield retaining cap 180. Once the coolant flow 700 exits from the radial passageway 428, it enters the outer circumferential coolant channel 430 and travels circumferentially about the channel 430 to cool the inner surface of the shield retaining cap 180. The coolant flow 700 can be exhausted back to the torch head by entering the radial coolant passageway 432 (shown in FIGS. 7*a-c* and 8*a-c*) disposed about 180 degrees from the radial coolant passageway 428. As explained above, the radial coolant passageway 432 is in fluid communication with the distal opening 418*b* of the liquid coolant outlet channel 418 embedded in the body 400 of the cartridge frame 112. The liquid coolant outlet channel 418 is configured to conduct the coolant flow 700 proximally toward its proximal opening 418 and into a corresponding opening (not shown) of the torch head, which completes the coolant flow path about the cartridge frame 112.

In some embodiments, the circumferential channels 426, 430, 610 of the cartridge 104 have axially broad faces for increased cooling/contact between coolant and heated components. In some embodiments, the entrance and exit for each of the circumferential channels 426, 430, 610 are offset about 180 degrees relative to each other to promote even flow and complete cooling about the cartridge frame 112 and/or between components (e.g., not favoring one shorter side coolant flow path 700 over the other).

In general, the coolant path 700 illustrates formation of multiple large coolant envelopes about many consumable components (e.g., nozzle 110, shield 114 and shield retaining cap 180) of the cartridge 104, where these envelopes provide a large surface area for the flow of coolant to directly contact and cool the components via conduction. As described above, the large cooling envelopes are provided by the cartridge frame 112, which utilizes a number of its surfaces, including sections of both its interior side surface 410 and its exterior side surface 408, to define portions of the coolant flow path 700 about the cartridge 102.

In another aspect, to assemble the cartridge 104, an emissive insert can be first inserted into the bore 200 of the electrode 108 at the distal end 202 of the electrode 108. The insulator 150 can be coupled to the nozzle 110 by disposing the insulator 150 into the substantially hollow nozzle body 110*a* via the proximal end 602 of the nozzle body 110*a*, which is in turn attached to the outer nozzle jacket 110*b*. The electrode 108 can be coupled to the resulting sub-assembly by disposing the electrode 108 into the hollow body of the insulator 150 from the proximal end of the insulator 150, while the flange(s) 109 of the electrode 108 axially and radially align with the insulator 150. The resulting sub-assembly is disposed into the cartridge frame 112 from its proximal end 402 with both the proximal end 602 of the nozzle body 110*a* and the proximal end 606 of the nozzle jacket 110*b* coupled to the interior side surface 410 of the cartridge frame 112. In some embodiments, the shield 114 is installed onto the resulting sub-assembly by disposing the proximal end 302 of the shield 114 into the cartridge frame 114 from its distal end 404. An interior surface of the proximal end 302 of the shield 114 can be coupled to the nozzle jacket 110*b* while an exterior surface of the proximal end 302 of the shield 114 can be affixed to the interior side surface 410 of the cartridge frame 112. Optionally, the shield retaining cap 180 can be affixed over a portion of the exterior surface of the cartridge frame 112 and a portion of the exterior surface of the shield 114 to further retain the shield 114 to the cartridge frame 112. Optionally, the retaining cap 120 can then be placed over and secured to the exterior surface of the proximal end 902 of the shield retaining cap 180 to secure the cartridge 104 to the torch head upon installation into the plasma arc torch.

Benefits of the present invention include reducing the cost of manufacturing the liquid-cooled cartridge 104 while ensuring adequate field life. For example, the usage of the shield retaining cap 180, which can be made from a stamping process, can reduce the material and manufacturing cost of the shield 114 by decreasing the diameter of the bar stock needed to create the shield 114. Other benefits of the present invention include moldable liquid cooled cartridge frame 112 with efficient coolant flow, consistent and accurate alignment and spacing between the electrode 108 and the nozzle 110 via the usage of the electrode flanges 109 and the insulator 150, and integrated plasma gas pressure metering and ramp down via the creation of the chamber 122 by the electrode flanges 109 and the insulator 150.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. An electrode for a consumable cartridge of a plasma arc torch, the electrode comprising:

a substantially hollow body defining a proximal end, a distal end and a longitudinal axis extending therebetween;

an emitter disposed at the distal end of the hollow body; and a plurality of flanges, including a proximal flange and a distal flange, disposed circumferentially about an external surface of the hollow body and extending radially outward, each flange defining one or more holes configured to conduct a gas flow therethrough along the external surface of the hollow body, wherein the one or more holes on the proximal flange define a first combined cross-sectional flow area that is different from a second combined cross-sectional flow area defined by the one or more holes on the distal flange.

2. The electrode of claim 1, wherein the distal flange is axially spaced and downstream from the proximal flange along the external surface of the hollow body.

3. The electrode of claim 2, wherein the proximal and distal flanges cooperatively define a chamber therebetween, the chamber radially bounded by the external surface of the hollow body of the electrode and an insulator surrounding at least a portion of the exterior surface of the hollow body.

4. The electrode of claim 3, wherein the one or more holes of the proximal and distal flanges are in fluid communication with the chamber.

5. The electrode of claim 3, wherein the first combined cross-sectional flow area is larger than the second combined cross-sectional flow area such that the chamber is pressurized by the gas flow entering the chamber from the one or more holes in the proximal flange and leaving the chamber from the one or more holes in the distal flange.

6. The electrode of claim 1, wherein a cross-sectional flow area of each of the one or more holes on the proximal flange is between about 0.0015 $inches^2$ and about 0.0075 $inches^2$.

7. The electrode of claim 1, wherein a cross-sectional flow area of each of the one or more holes on the distal flange is about 0.008 $inches^2$.

8. The electrode of claim 1, wherein the one or more holes on the distal flange are configured to provide swirling to a gas flow therethrough.

9. The electrode of claim 1, wherein the plurality of flanges include alignment surfaces configured to provide axial and radial alignment of the electrode relative to a nozzle when installed in the plasma arc torch.

10. The electrode of claim 1, wherein the plurality of flanges increases a diameter of the electrode in relation to a diameter of the hollow body by about 35 percent or higher.

11. The electrode of claim 1, wherein each of the plurality of flanges has a radial height of about 0.125 inches.

12. The electrode of claim 1, wherein the proximal flange has an axial thickness of about 0.08 inches and the distal flange has an axial thickness of about 0.11 inches.

13. The electrode of claim 1, wherein the hollow body of the electrode is configured to conduct a liquid coolant therethrough.

14. The electrode of claim 1, wherein the plurality of flanges are located at a distal half of the electrode body close to the distal end of the electrode.

15. The electrode of claim 14, wherein the plurality of flanges is located on a distal ⅓ portion of the electrode close to the distal end of the electrode.

16. The electrode of claim 1, further comprising a resilient element circumferentially coupled to the proximal end of the hollow body of the electrode for engaging the electrode to a torch body of the plasma arc torch without a threaded connection, the resilient element configured to provide an electrical connection between the electrode and the torch body.

17. The electrode of claim 1, further comprising a radially-extending contact surface shaped to provide primary conduction for the operating current.

18. A consumable cartridge of a liquid-cooled plasma arc torch, the consumable cartridge comprising:

- an electrode having a substantially hollow body and a plurality of flanges disposed circumferentially about an external surface of the hollow body;
- an insulator circumferentially disposed about a portion of the external surface of the hollow body of the electrode, the plurality of flanges of the electrode in cooperation with the insulator to define a gas chamber between the electrode and the insulator;
- a nozzle circumferentially disposed about the electrode and physically connected to the electrode via the insulator, wherein the nozzle comprises a nozzle jacket and a nozzle body, the nozzle jacket circumferentially disposed about an external surface of the nozzle body and defining a chamber therebetween; and
- a cartridge frame comprising an electrically insulating material with at least one cooling channel extending therethrough, wherein a proximal portion of the nozzle is disposed within and coupled to the cartridge frame.

19. The consumable cartridge of claim 18, further comprising a shield circumferentially disposed about the nozzle, wherein a proximal portion of the shield is disposed within and coupled to the cartridge frame.

20. The consumable cartridge of claim 19, further comprising a retaining cap circumferentially disposed over an exterior surface of a proximal portion of the cartridge frame.

21. The consumable cartridge of claim 20, further comprising a stamped connector circumferentially disposed over an exterior surface of a distal portion of the cartridge frame, the stamped connector configured to physically retain the shield to the retaining cap.

22. The consumable cartridge of claim 18, wherein the insulator is comprised of an electrically insulating material with an oxygen index of about 0.9 or more.

23. The consumable cartridge of claim 18, wherein the insulator is configured to axially and radially align the electrode and the nozzle relative to each other.

24. The consumable cartridge of claim 18, wherein the insulator is at least 0.020 inches in thickness in a radial direction.

25. The consumable cartridge of claim 18, wherein the plurality of flanges include a proximal flange and a distal flange, each flange having one or more holes extending therethrough.

26. The consumable cartridge of claim 25, wherein the one or more holes on the proximal flange define a first combined cross-sectional flow area that is larger than a second combined cross-sectional flow area defined by the one or more holes on the distal flange.

27. The consumable cartridge of claim 25, wherein the gas chamber is axially bounded by the proximal and distal flanges and radially bounded by the external surface of the hollow body of the electrode and the insulator.

28. A method for conducting one or more fluid flows through a consumable cartridge of a plasma arc torch, the method comprising:

- providing a consumable cartridge comprising a cartridge frame coupled to a nozzle that is couples to an electrode via an insulator, the electrode comprising at least a proximal flange and a distal flange disposed circumferentially about an external surface of a hollow body of the electrode;
- providing a plasma gas flow to the external surface of the hollow body of the electrode;
- conducting the plasma gas flow through at least one hole on the proximal flange of the electrode to a chamber created between the proximal and distal flanges of the electrode, the chamber being bounded axially by the proximal and distal flanges and radially by the external surface of the hollow body of the electrode and the insulator;
- metering and swirling the plasma gas flow as the plasma gas flow exits the chamber via at least one hole on the distal flange; and
- conducting the plasma gas flow distally to a plasma chamber defined between a distal end of the electrode and the nozzle.

29. The method of claim 28, wherein the at least one hole in the proximal flange defines a first combined cross-sectional flow area and the at least one hole in the distal flange defines a second combined cross-sectional flow area, the first combined cross-sectional flow area being different from the second combined cross-sectional flow area.

30. The method of claim 29, further comprising pressurizing the chamber by the plasma gas flow based on the difference between the first and second combined cross-sectional flow areas.

31. The method of claim 28, wherein the at least one hole on the distal flange is configured to introduce the swirling to the plasma gas flow.

32. The method of claim 28, wherein the at least one hole on the proximal flange is configured to meter the plasma gas flow into the chamber.

33. The method of claim 28, wherein the plasma gas flow is provided to the cartridge without traversing through cartridge frame.

34. The method of claim 28, further comprising:

- conducting a coolant flow into the cartridge via an inlet coolant channel disposed in a body of the cartridge frame;
- circulating the coolant flow around at least one of the electrode or the nozzle coupled to the cartridge frame; and conducting the coolant flow away from the cartridge via an outlet coolant channel disposed in the body of the cartridge frame.

35. The method of claim 34, further comprising:

conducting a shield gas flow into the cartridge via an inlet shield gas channel disposed in the body of the cartridge frame; and providing, by the cartridge frame, the shield gas flow to a shield with a portion of which disposed within and coupled to the cartridge frame.

36. The method of claim 35, further comprising swirling the shield gas flow by one or more holes on a hollow body of the shield as the shield gas flow enters the shield.

* * * * *